United States Patent
Itami et al.

(10) Patent No.: US 9,804,385 B2
(45) Date of Patent: Oct. 31, 2017

(54) OBJECT DETECTOR AND SENSING APPARATUS

(71) Applicants: Yukio Itami, Kanagawa (JP); Shigeaki Imai, Kanagawa (JP); Tadashi Nakamura, Tokyo (JP)

(72) Inventors: Yukio Itami, Kanagawa (JP); Shigeaki Imai, Kanagawa (JP); Tadashi Nakamura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 250 days.

(21) Appl. No.: 14/699,198

(22) Filed: Apr. 29, 2015

(65) Prior Publication Data
US 2015/0331108 A1 Nov. 19, 2015

(30) Foreign Application Priority Data
May 13, 2014 (JP) ................................ 2014-099263

(51) Int. Cl.
*H01J 3/14* (2006.01)
*G02B 26/12* (2006.01)
(Continued)

(52) U.S. Cl.
CPC ............... *G02B 26/12* (2013.01); *G01C 3/08* (2013.01); *G01J 1/0271* (2013.01);
(Continued)

(58) Field of Classification Search
CPC ...... G01S 7/4817; G01S 7/4813; G01S 7/481; G02B 26/108; G02B 26/12
See application file for complete search history.

(56) References Cited

U.S. PATENT DOCUMENTS

| | | | | | |
|---|---|---|---|---|---|
| 5,170,278 | A | * | 12/1992 | Wada | ........................ G02B 5/09 359/212.1 |
| 6,786,612 | B2 | * | 9/2004 | Weinreich | ............ G02B 7/1821 359/871 |

(Continued)

FOREIGN PATENT DOCUMENTS

| | | |
|---|---|---|
| JP | 2006-349449 | 12/2006 |
| JP | 2013-170962 | 9/2013 |

(Continued)

OTHER PUBLICATIONS

U.S. Appl. No. 14/523,042, filed Oct. 24, 2014.
U.S. Appl. No. 14/554,498, filed Nov. 26, 2014.
U.S. Appl. No. 14/658,650, filed Mar. 16, 2015.

*Primary Examiner* — Thanh Luu
(74) *Attorney, Agent, or Firm* — Oblon, McClelland, Maier & Neustadt, L.L.P.

(57) ABSTRACT

An object detector and a sensing apparatus are provided. The object detector includes a light source, a light deflector configured to deflect light emitted from the light source, and a photodetector configured to detect the light that is deflected by the light deflector and then is reflected at an object, where the light deflector includes a plurality of reflection planes that rotate on a rotation axis, the reflection planes are oblique to the rotation axis and are rotationally symmetrical about the rotation axis, and the light that is emitted from the light source enters the light deflector in a direction parallel to the rotation axis. The sensing apparatus includes the object detector, and a monitoring controller configured to determine whether an object is present, and obtain movement information of the object including at least one of moving direction and moving speed of the object.

19 Claims, 22 Drawing Sheets

(51) Int. Cl.
 *G01S 17/02* (2006.01)
 *G01J 1/02* (2006.01)
 *G01J 1/04* (2006.01)
 *G01C 3/08* (2006.01)
 *G01S 17/10* (2006.01)
 *G01S 17/42* (2006.01)
 *G01S 17/58* (2006.01)
 *G01S 17/93* (2006.01)
 *G01S 7/481* (2006.01)

(52) U.S. Cl.
 CPC ........... *G01J 1/0414* (2013.01); *G01S 7/4813* (2013.01); *G01S 7/4814* (2013.01); *G01S 7/4815* (2013.01); *G01S 7/4816* (2013.01); *G01S 7/4817* (2013.01); *G01S 17/026* (2013.01); *G01S 17/10* (2013.01); *G01S 17/42* (2013.01); *G01S 17/58* (2013.01); *G01S 17/936* (2013.01); *G02B 26/125* (2013.01)

(56) References Cited

U.S. PATENT DOCUMENTS

| | | |
|---|---|---|
| 2013/0229645 A1 | 9/2013 | Suzuki et al. |
| 2014/0009747 A1 | 1/2014 | Suzuki et al. |
| 2014/0034817 A1 | 2/2014 | Nakamura et al. |
| 2014/0036071 A1 | 2/2014 | Nakamura et al. |
| 2014/0209793 A1 | 7/2014 | Nakamura et al. |

FOREIGN PATENT DOCUMENTS

| | | |
|---|---|---|
| JP | 2013-205095 | 10/2013 |
| JP | 2014-020889 | 2/2014 |
| JP | 2014-029317 | 2/2014 |
| JP | 2014-032149 | 2/2014 |
| JP | 2014-145744 | 8/2014 |
| JP | 2014-232265 | 12/2014 |
| JP | 2014-235075 | 12/2014 |

\* cited by examiner

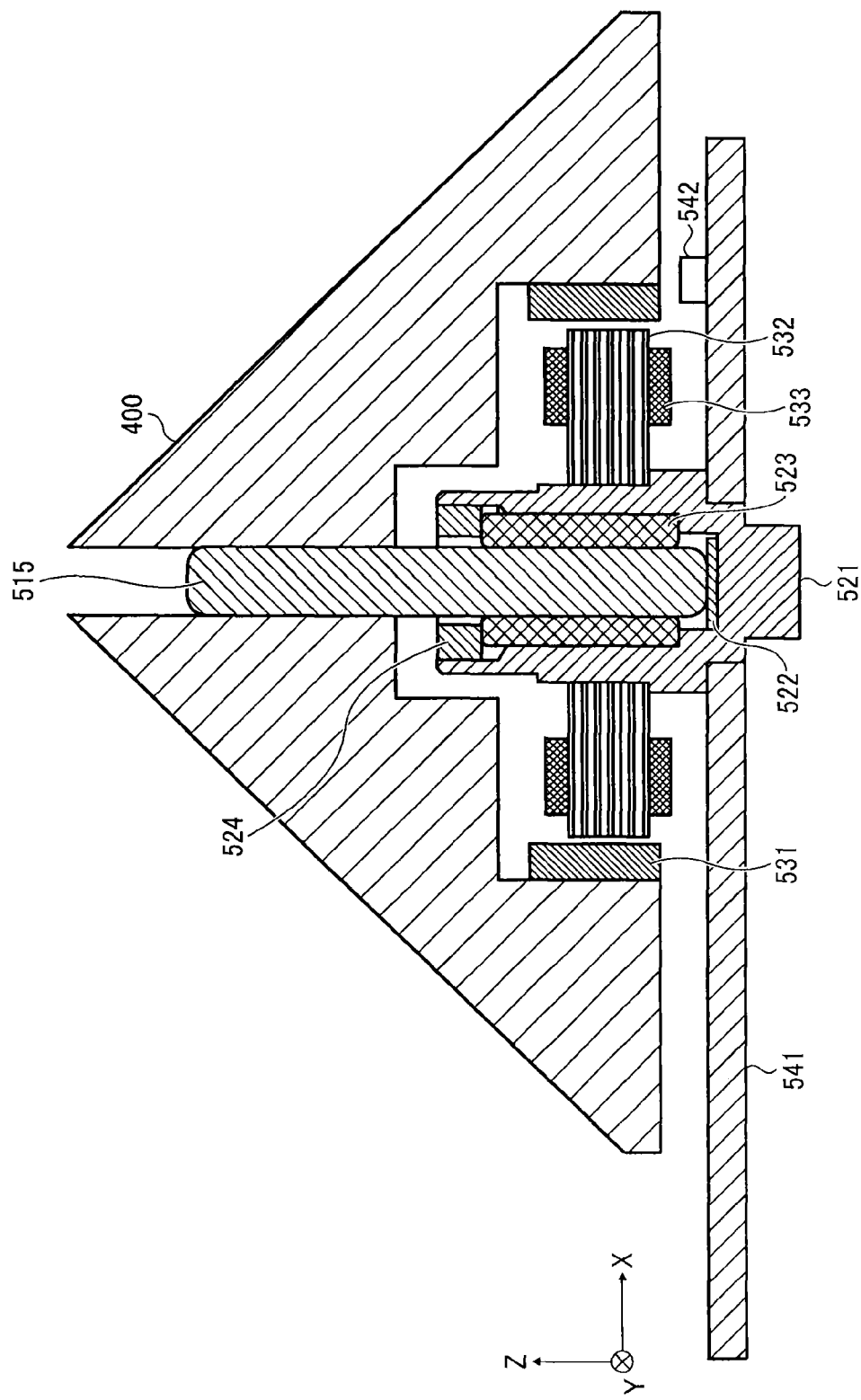

FIG. 18

| OPTICAL DEFLECTOR | | | LIGHT-EMISSION CYCLE (SECOND) | | | LIGHT-EMISSION FREQUENCY (Hz) | | |
|---|---|---|---|---|---|---|---|---|
| NUMBER OF REVOLUTIONS (rpm) | NUMBER OF REVOLUTIONS (rps) | TIME FOR SINGLE REVOLUTION (SECOND) | RESOLUTION OF PROJECTION ANGLE | | | RESOLUTION OF PROJECTION ANGLE | | |
| | | | 1° | 0.5° | 0.25° | 1° | 0.5° | 0.25° |
| 500 | 8.3 | 0.120 | 0.0003333 | 0.0001667 | 0.0000833 | 3000 | 6000 | 12000 |
| 1000 | 16.7 | 0.060 | 0.0001667 | 0.0000833 | 0.0000417 | 6000 | 12000 | 24000 |
| 2000 | 33.3 | 0.030 | 0.0000833 | 0.0000417 | 0.0000208 | 12000 | 24000 | 48000 |
| 3000 | 50.0 | 0.020 | 0.0000556 | 0.0000278 | 0.0000139 | 18000 | 36000 | 72000 |
| 4000 | 66.7 | 0.015 | 0.0000417 | 0.0000208 | 0.0000104 | 24000 | 48000 | 96000 |
| 5000 | 83.3 | 0.012 | 0.0000333 | 0.0000167 | 0.0000083 | 30000 | 60000 | 120000 |
| 6000 | 100.0 | 0.010 | 0.0000278 | 0.0000139 | 0.0000069 | 36000 | 72000 | 144000 |

| | SELECTED GROUP OF LIGHT-EMITTING UNITS ||||| 
|---|---|---|---|---|---|
| LAYER \ PROJECTION ANGLE | −80° | −45° | 0° | 45° | 80° |
| LAYER 1 | GROUP1 | GROUP2 | GROUP3 | GROUP4 | GROUP5 |
| LAYER 2 | GROUP6 | GROUP6 | GROUP6 | GROUP6 | GROUP6 |
| LAYER 3 | GROUP7 | GROUP8 | GROUP9 | GROUP10 | GROUP11 |

OBJECT DETECTOR AND SENSING APPARATUS

CROSS-REFERENCE TO RELATED APPLICATION

This patent application is based on and claims priority pursuant to 35 U.S.C. §119(a) to Japanese Patent Application No. 2014-099263, filed on Mar. 13, 2014, in the Japan Patent Office, the entire disclosure of which is hereby incorporated by reference herein.

BACKGROUND

Technical Field

Example embodiments of the present invention relate to an object detector and a sensing apparatus.

Background Art

In recent years, object detectors that detect the presence of an object or the distance to the object are being developed.

SUMMARY

Embodiments of the present invention described herein provide an object detector and a sensing apparatus. The object detector includes a light source, a light deflector configured to deflect light emitted from the light source, and a photodetector configured to detect the light that is deflected by the light deflector and then is reflected at an object, where the light deflector includes a plurality of reflection planes that rotate on a rotation axis, the reflection planes are oblique to the rotation axis and are rotationally symmetrical about the rotation axis, and the light that is emitted from the light source enters the light deflector in a direction parallel to the rotation axis. The sensing apparatus includes the object detector, and a monitoring controller configured to determine whether or not an object is present, and obtain movement information of the object including at least one of moving direction and moving speed of the object, based on an output from the object detector.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

FIG. 8 is a sectional view A-A of FIG. 7B, according to an example embodiment of the present invention.

FIG. 18 depicts examples of the light-emission cycle and light-emission frequency calculated by using the number of revolutions of the rotor 400 and the resolution of the projection angle as parameters, according to an example embodiment of the present invention.

Figure 1:
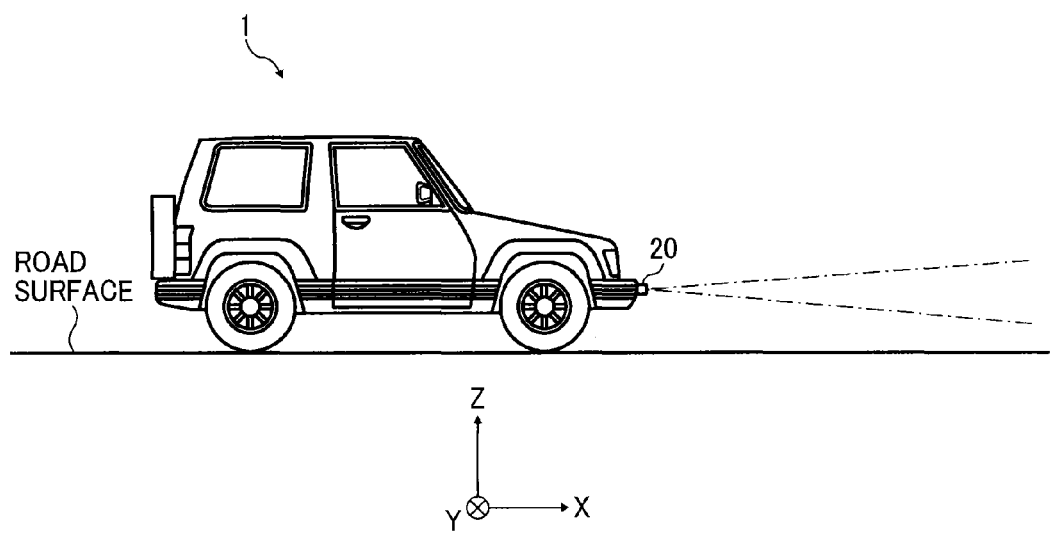
FIG. 1 illustrates the external appearance of a vehicle for which a laser radar is provided, according to an example embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to he limited to the specific terminology so selected and it is to be understood that each specific element includes all technical equivalents that have the same structure, operate in a similar manner, and achieve a similar result.

Some embodiments of the present invention are described with reference to FIG. 1 to FIG. 18. FIG. 1 illustrates the external appearance of a vehicle 1 for which a laser radar 20 is provided as an object detector, according to an example embodiment of the present invention.

The laser radar 20 is fitted, for example, to a portion near the license plate at the front of the vehicle 1. In the XYZ three-dimensional orthogonal coordinate system according to the present example embodiment, it is assumed that the direction orthogonal to the road surface is a Z-axis direction, and that the traveling direction of the vehicle 1 is the +X direction.

Figure 2:
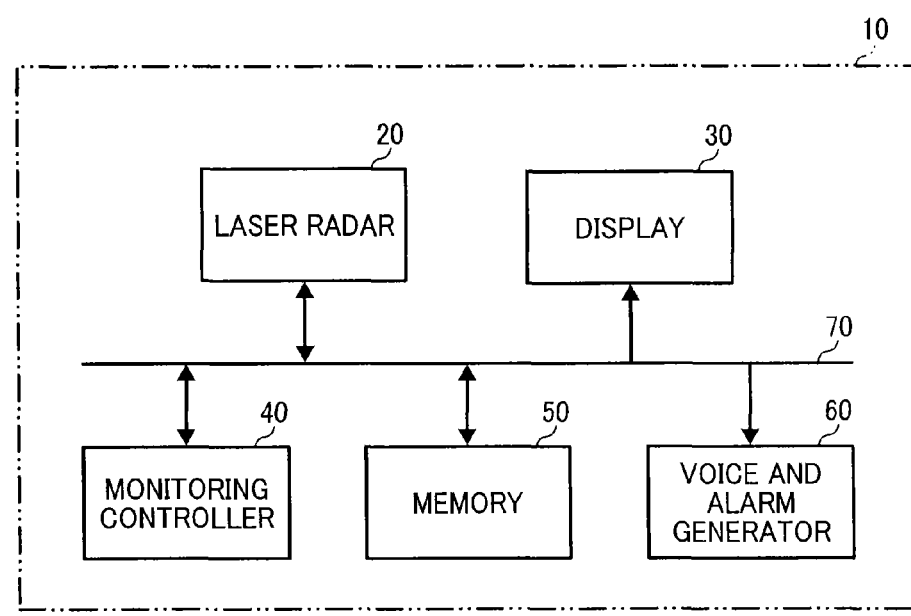
FIG. 2 is a block diagram of the configuration of a monitoring apparatus according to an example embodiment of the present invention.

In the vehicle 1, as depicted in FIG. 2 for example, a display 30, a monitoring controller 40, a memory 50, and a voice and alarm generator 60 are provided. These elements are electrically connected to each other through a bus 70 through which data can be transmitted.

In the present example embodiment, the monitoring apparatus 10 that serves as a sensing apparatus includes the laser radar 20, the display 30, the monitoring controller 40, the memory 50, and the voice and alarm generator 60. The monitoring apparatus 10 is fitted to the vehicle 1. More specifically, the monitoring apparatus 10 is electrically connected to the main controller of the vehicle 1.

Figure 3:
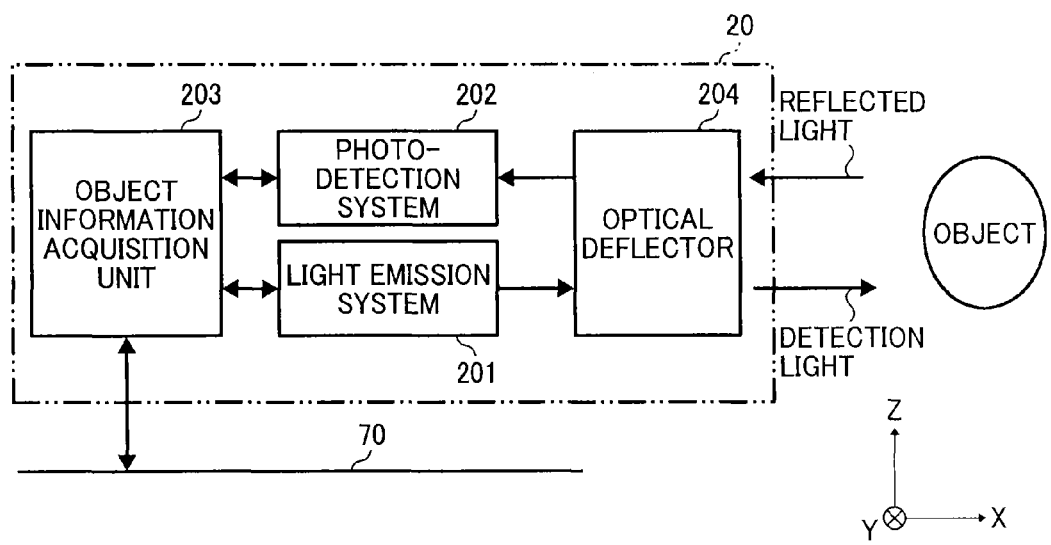
FIG. 3 illustrates the configuration of a laser radar according to an example embodiment of the present invention.
Figure 6:
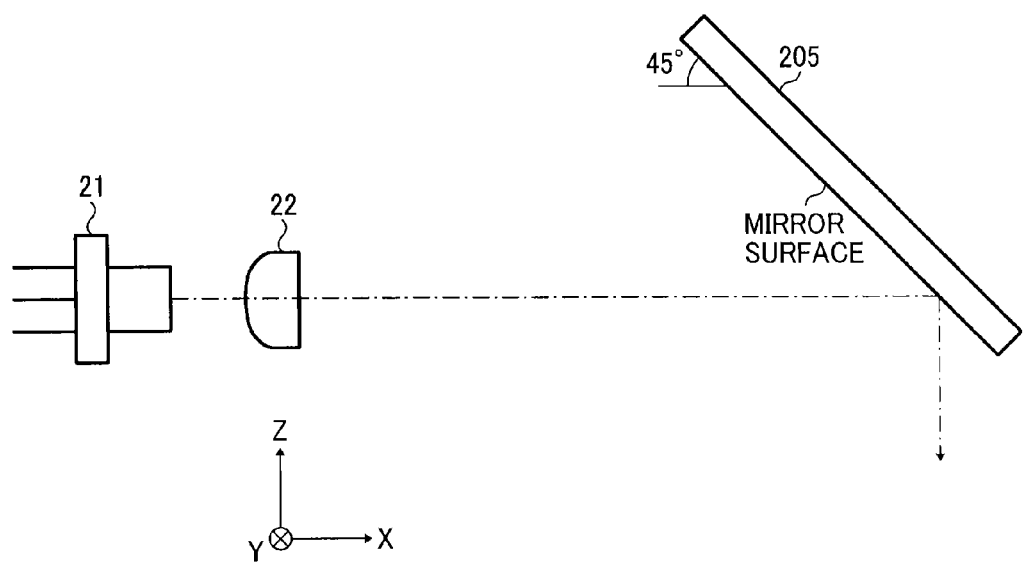
FIG. 6 illustrates a mirror according to an example embodiment of the present invention.

As illustrated in FIG. 3, the laser radar 20 includes, for example, a light emission system 201, a light deflector 204, a photo-detection system 202, an object information acquisition unit 203, and a mirror 205 (see, for example, FIG. 6). These elements are accommodated in a housing. In the present example embodiment, the light emission system 201 is arranged on the −Z side of the photo-detection system 202. Moreover, the maximum distance at which an object is detectable of the laser radar 20 is set to two-hundred meters.

In the following description, the maximum distance at which an object is detectable may be referred to as "maximum detectable distance" for the purpose of simplification.

Figure 4:
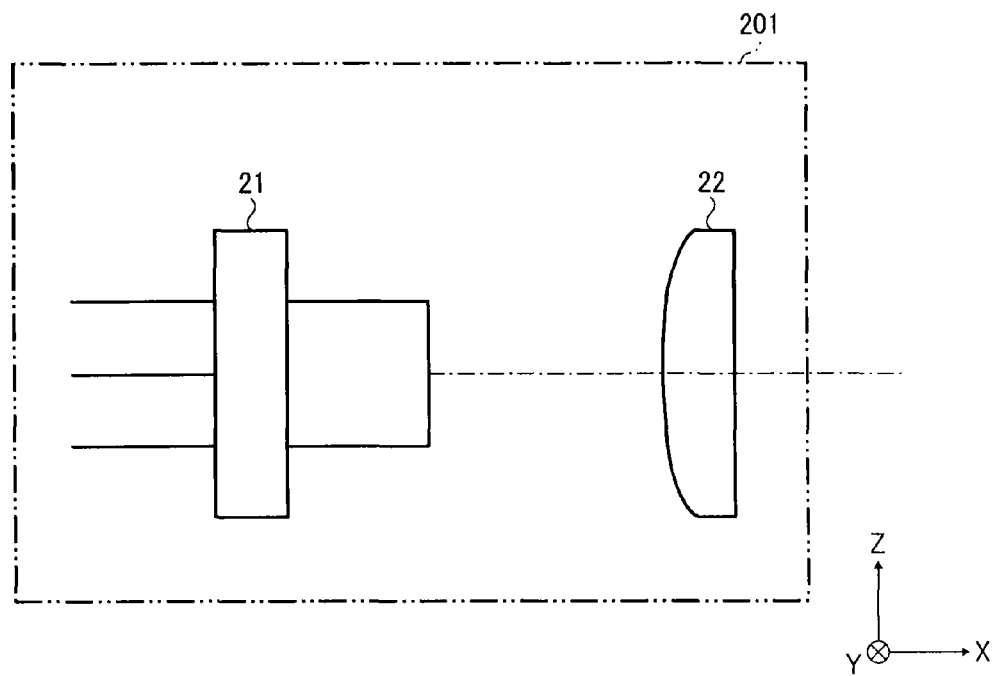
FIG. 4 illustrates a light emission system according to an example embodiment of the present invention.
Figure 5:
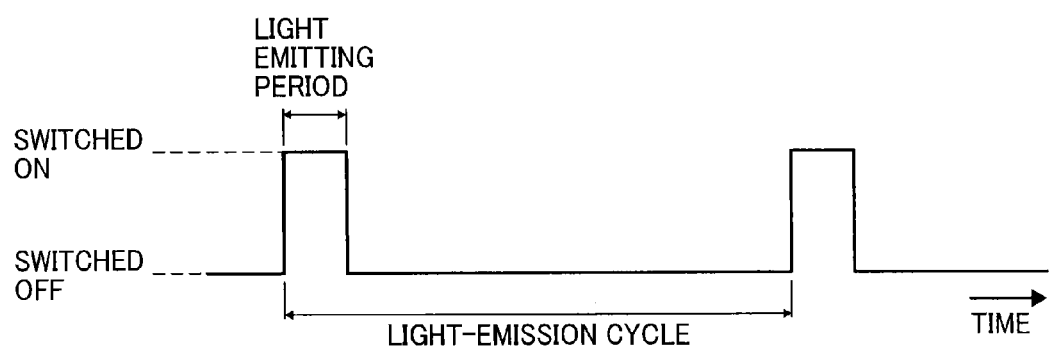
FIG. 5 illustrates light emitting periods and light-emission cycles according to an example embodiment of the present invention.

As illustrated in FIG. 4, the light emission system 201 includes, for example, a light source 21 and a coupling lens 22.

The light source 21 has an end-surface emitting laser, and is mounted on a circuit board for which a light source drive circuit is provided. In the present example embodiment, the light source 21 is arranged so as to emit light in the +X direction.

The light source 21 is switched on and switched off by the object information acquisition unit 203. In order to detect an object, the object information acquisition unit 203 controls the light source 21 to emit pulsed light. In the present example embodiment, it is assumed the light emitting period of the light source 21 is 10 n seconds for each pulse. However, no limitation is intended thereby. Note that the period during which the light source 21 is switched on in a single pulse may be referred to as "light emitting period" in the following description (see FIG. 5). Moreover, the time interval of two continuous pulses is referred to as "light-emission cycle" (see FIG. 5).

Assuming that the difference between the time during which the optical pulse from the light source 21 is emitted and the time during which the reflection light of the optical pulse is detected is Δt and that the speed of light is C, the distance L to the object is calculated by the following equation.

$$L = \Delta t * C/2$$

In the present example embodiment, as the maximum distance at which an object is detectable of the laser radar 20 is set to two-hundred meters, Δt becomes about 1.3 μ seconds when "L=200 m".

For example, when there are two objects that are ahead of the vehicle by two-hundred meters and four-hundred meters, respectively, and the light source 21 emits light with the light-emission cycle of 1.3 μ seconds, the reflection light from the object that is ahead of the vehicle by four-hundred meters may be recognized as the reflection light from the object that is ahead of the object by two-hundred meters. Such erroneous detection can be avoided by setting the light-emission cycle to a value that is equal to or greater than the difference time Δt that corresponds to twice the maximum detectable distance. In other words, such erroneous detection can be avoided by setting the light-emission cycle to 2.7 μ seconds or greater when the maximum detectable distance is two-hundred meters. As the amount of the heat generated by laser elements increases and the life of the laser elements becomes short when the light-emission cycle is short, the light-emission cycle is to be set in consideration of the life of the laser elements.

The coupling lens 22 is arranged on the +X side of the light source 21, and the coupling lens 22 makes the light emitted from the light source 21 become parallel light rays or diverging light that slightly diverges. In the present example embodiment, a planoconvex lens is used as the coupling lens 22. The light that has passed through the coupling lens 22 is equivalent to the light that is emitted from the light emission system 201.

In the present example embodiment, the minor 205 is arranged on the +X side of the light emission system 201 and the photo-detection system 202. Moreover, as illustrated in FIG. 6, the mirror surface of the minor 205 is arranged so as to be oblique to the X-axis direction by 45 degrees. Accordingly, the light that is emitted from the light emission system

201 and is reflected at the mirror surface of the minor 205 has the direction of travel in the −Z direction.

Figure 7A:
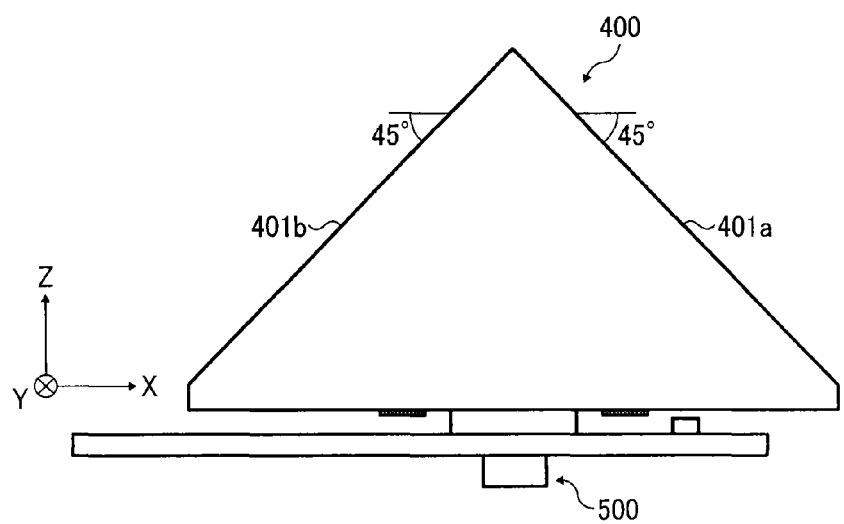
FIGS. 7A and 7B each illustrate a light deflector according to an example embodiment of the present invention.
Figure 7B:
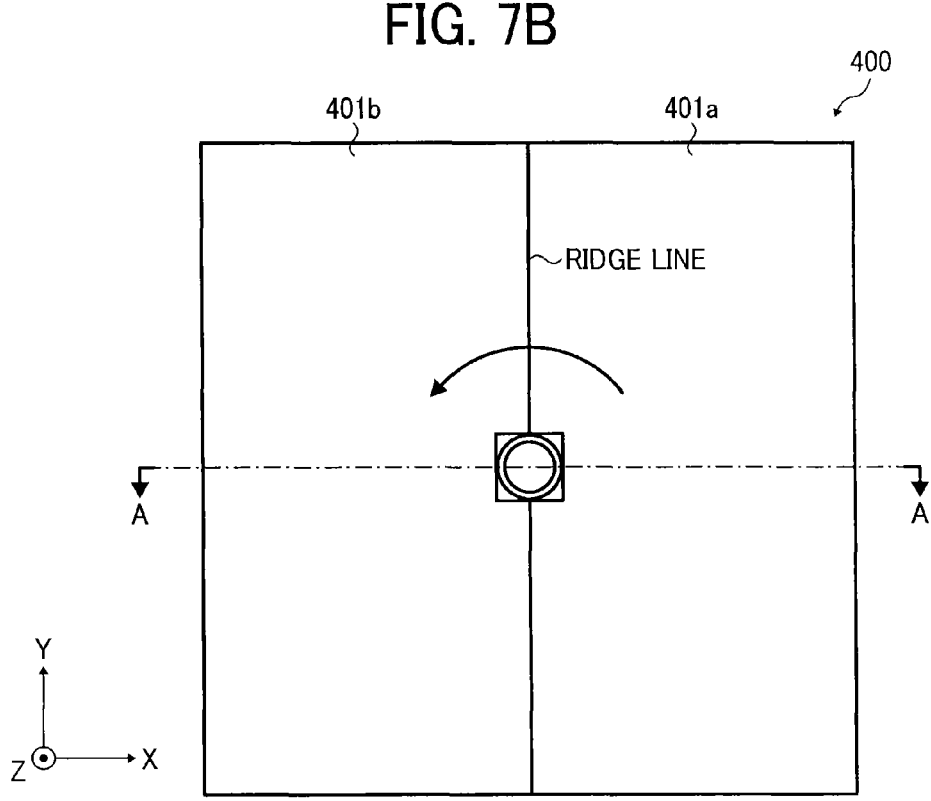

As illustrated in FIG. 7A, FIG. 7B, and FIG. 8, the light deflector 204 includes a rotor 400 and a driver 500. FIG. 8 is a sectional view A-A of FIG. 7B, according to the present example embodiment.

The rotor 400 includes two reflection planes (401a, 401b) that are oblique with reference to the X-axis direction by 45 degrees. Moreover, the rotor 400 has a through hole in the center in the Z-axis direction. The axis that runs through the center of the through hole and is parallel with the Z-axis is the rotation axis of the rotor 400. The two reflection planes are rotationally symmetrical about the rotation axis.

The reflection plane 401a contacts the reflection plane 401b at the edges on the +Z side. The boundary line between the reflection plane 401a and the reflection plane 401b forms a ridge line that is orthogonal to the rotation axis of the rotor 400 (see FIG. 7B).

The rotor 400 is produced by cutting aluminum alloy. In particular, the reflection planes are produced by ultraprecision cutting, and are coated by transparent films.

Moreover, the rotor 400 has inner space that is connected to the through hole, and the main components of the driver 500 are accommodated in the inner space.

The driver 500 includes, for example, a shaft 515, a bearing housing 521, a thrust bearing member 522, a bearing member 523, a seal member 524, a rotor magnet 531, a stator core 532, wire-wound coils 533, a circuit board 541, a Hall generator 542, a driver integrated circuit (IC), and a connector.

The shaft 515 is a rod whose longer-side direction is in the Z-axis direction, and is fitted to the through hole of the rotor 400 by shrink-fitting. Accordingly, the rotation axis runs through the center of the shaft 515, and the rotor 400 rotates on the Z-axis as the shaft 515 rotates. The material of the shaft 515 is desirably martensitic stainless steel (e.g., SUS420J2). This is because martensitic stainless steel has high wear resistance and hardening may be performed on the martensitic stainless steel to increase the surface hardness. Around the shaft 515, grooves for dynamic pressure are formed to achieve stability at high speed rotation.

The bearing housing 521 is a member whose outside shape is approximately cylindrical where the height is in the Z-axis direction, and a hole is formed in the center of the plane on the +Z side and the hole extends towards the −Z direction. The thrust bearing member 522 is disposed at the bottom of the hole, and the bearing member 523 is disposed around the wall of the hole. Moreover, the seal member 524 is disposed in the proximity of the opening of the hole.

The bearing member 523 is a dynamic pressure oil-retaining bearing, and the gap inside the bearing member 523 is set to about 10 μm in diameter. The grooves for dynamic pressure may be disposed on the inner surface of the bearing member 523, but it is desirable that the grooves for dynamic pressure be disposed around the shaft 515 in view of the processability. The shaft 515 on the −Z side is inserted into the space surrounded by the bearing member 523.

The bearing that is disposed in the thrusting direction of the shaft 515 is a pivot bearing, and the convex-curved surface that is formed on the edge on the −Z side contacts the thrust bearing member 522.

The thrust bearing member 522 is made of, for example, martensitic stainless steel, ceramics, metal on which hardening processes such as diamond-like carbon (DLC) coating are performed, and resin material, and has sufficient lubricity. Accordingly, the production of abrasion powder is prevented.

The seal member 524 prevents oil from leaking.

The rotor magnet 531 is a ring-shaped bond magnet where resin is used as a binder, and is fitted to the inner surface of the rotor 400. The rotor magnet 531 is polarized so as to have twelve poles (i.e., six pairs of two poles) round the circumference.

The stator core 532 is attached to the bearing housing 521. Moreover, the nine wire-wound coils 533 are provided for the stator core 532 round the circumference. The rotor magnet 531 generates torque with the circumference of the stator core 532 and rotates.

More specifically, the rotor magnet 531, the stator core 532, and the wire-wound coil 533 form a brushless motor with twelve poles and nine slots.

On the circuit board 541, a wiring pattern that electrically connects the wire-wound coils 533 to the driver IC, a wiring pattern that electrically connects the Hall generator 542 to the driver IC, and a wiring pattern that electrically connects the connector to the Hall generator 542 and the driver IC are formed. Moreover, the bearing housing 521 is fitted to the circuit board 541.

The Hall generator 542 generates and outputs a signal for detecting the boundary of the magnetic poles NS according to the polarization with the twelve poles of the rotor magnet 531. In the signal generated by the Hall generator 542, the position information of the rotor 400 and the rotation speed information are included.

The driver IC refers to the output signal of the Hall generator 542 as a position signal of the rotor 400, and switches the excitation of the wire-wound coil 533. Accordingly, the rotation of the rotor 400 is maintained.

Moreover, the driver IC controls the rotor 400 so as to rotate at a constant speed by comparing the rotation speed detection signal obtained by shaping the waveform of the output signal of the Hall generator 542 with a reference clock signal supplied from a controller. Such controlling processes are performed by a phase-locked loop (PLL) using a phase detector.

A harness is connected to the connector, and the input and output of control signals for the power supply from the object information acquisition unit 203, the activation and termination of the motor, and the number of revolutions of the motor is performed through the connector. In other words, the object information acquisition unit 203 controls the rotation of the rotor 400.

Figure 9:
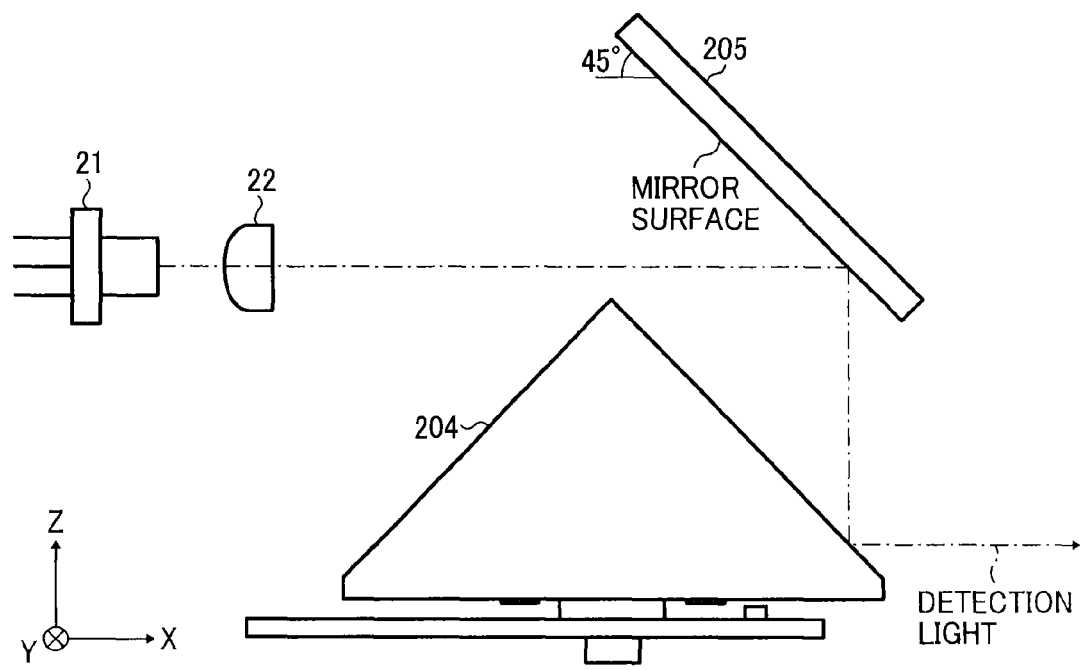
FIG. 9 illustrates the relative positions of a mirror and a light deflector according to an example embodiment of the present invention.

As illustrated in FIG. 9 for example, the light deflector 204 is arranged on the −Z side of the mirror 205. In the present example embodiment, the light emitted from the light source 21 is coupled by the coupling lens 22, and then is reflected at the mirror 205 and enters the reflection planes of the light deflector 204. Here, the traveling direction of the light that is reflected at the mirror 205 and enters the reflection planes of the light deflector 204 is parallel to the rotation axis of the light deflector 204.

The light that is reflected at the reflection planes of the light deflector 204 is the detection light that is emitted from the laser radar 20. The traveling direction of the detection light is orthogonal to the Z-axis direction. The position of the detection light with reference to the Z-axis direction is set such that other vehicles can detect the detection light.

Figure 10:
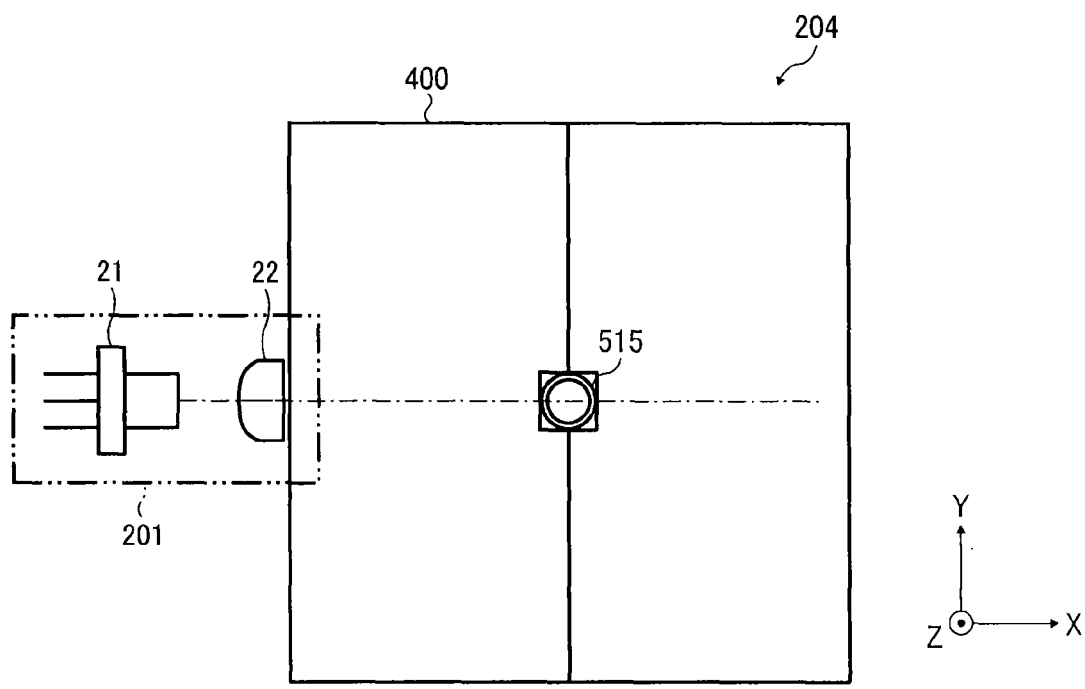
FIG. 10 illustrates the relative positions of a light emission system and a light deflector according to an example embodiment of the present invention.

FIG. 10 illustrates the relative positions of the light emission system 201 and the light deflector 204 when viewed from the +Z side, according to the present example embodiment. On the orthogonal projection of an XY plane, the light that is emitted from the light emission system 201 is designed to pass through the center of the shaft 515 of the light deflector 204.

Figure 11:
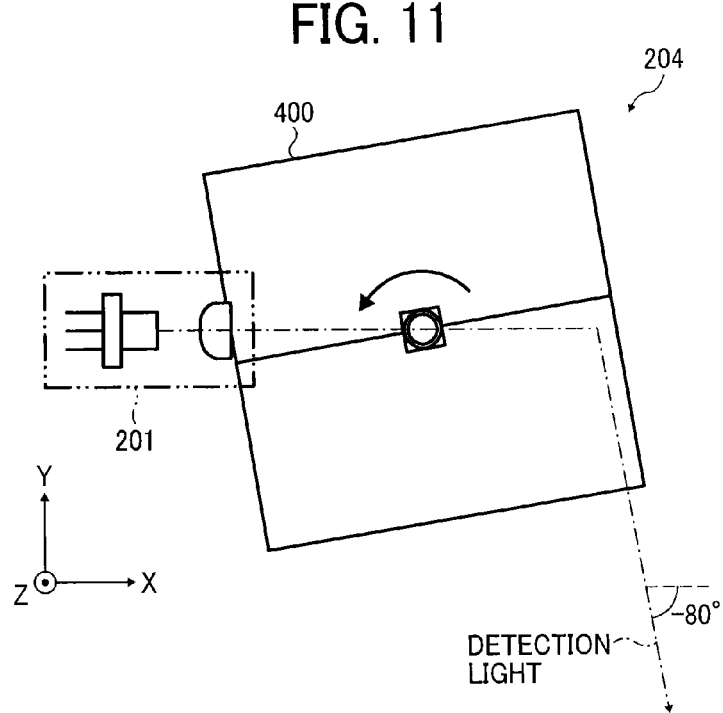
FIG. 11 illustrates the projection angle of detection light at the start timing of scanning according to an example embodiment of the present invention.
Figure 12:
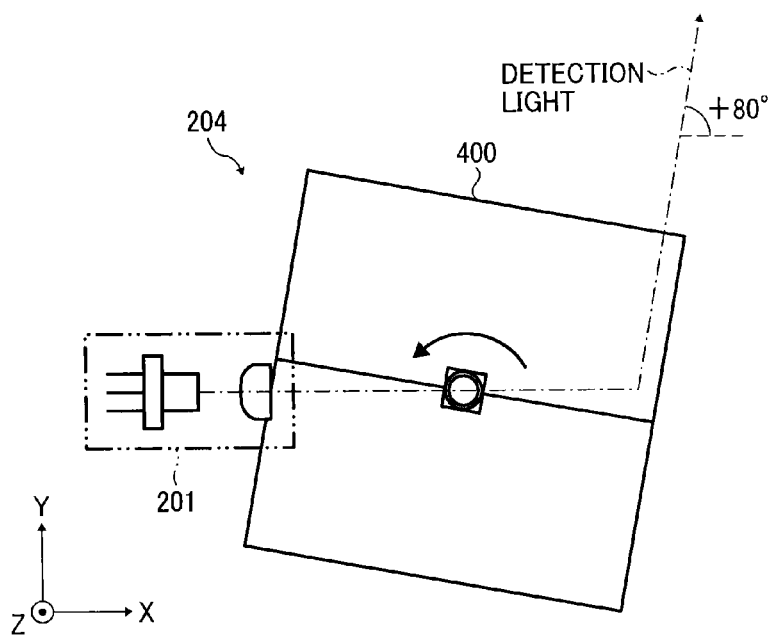
FIG. 12 illustrates the projection angle of detection light at the end timing of scanning according to an example embodiment of the present invention.

When the rotor 400 rotates, the traveling direction of the detection light changes on a plane orthogonal to the Z-axis direction (see FIG. 11 and FIG. 12). Accordingly, the detection light is scanned along the Y-axis direction as the reflecting mirror of the light deflector 204 rotates. In the present example embodiment, the timing in which the angle of the traveling direction of the detection light is −80 degrees with reference to the X-axis direction (see FIG. 11) is the start timing of scanning, and the timing in which the angle of the traveling direction of the detection light is +80 degrees with reference to the X-axis direction (see FIG. 12) is the end timing of scanning. As described above, the detection light is scanned in the +Y direction. The area that is scanned by the detection light is referred to as a detection area.

In the following description, the tilt angle of the traveling direction of the detection light with reference to the X-axis direction may be referred to as a "projection angle". Moreover, the angle which the traveling direction of the detection light at the start timing of scanning forms with the traveling direction of the detection light at the end timing of scanning may be referred to as a "scanning angle". In the present example embodiment, the scanning angle is 160 degrees.

Figure 13:
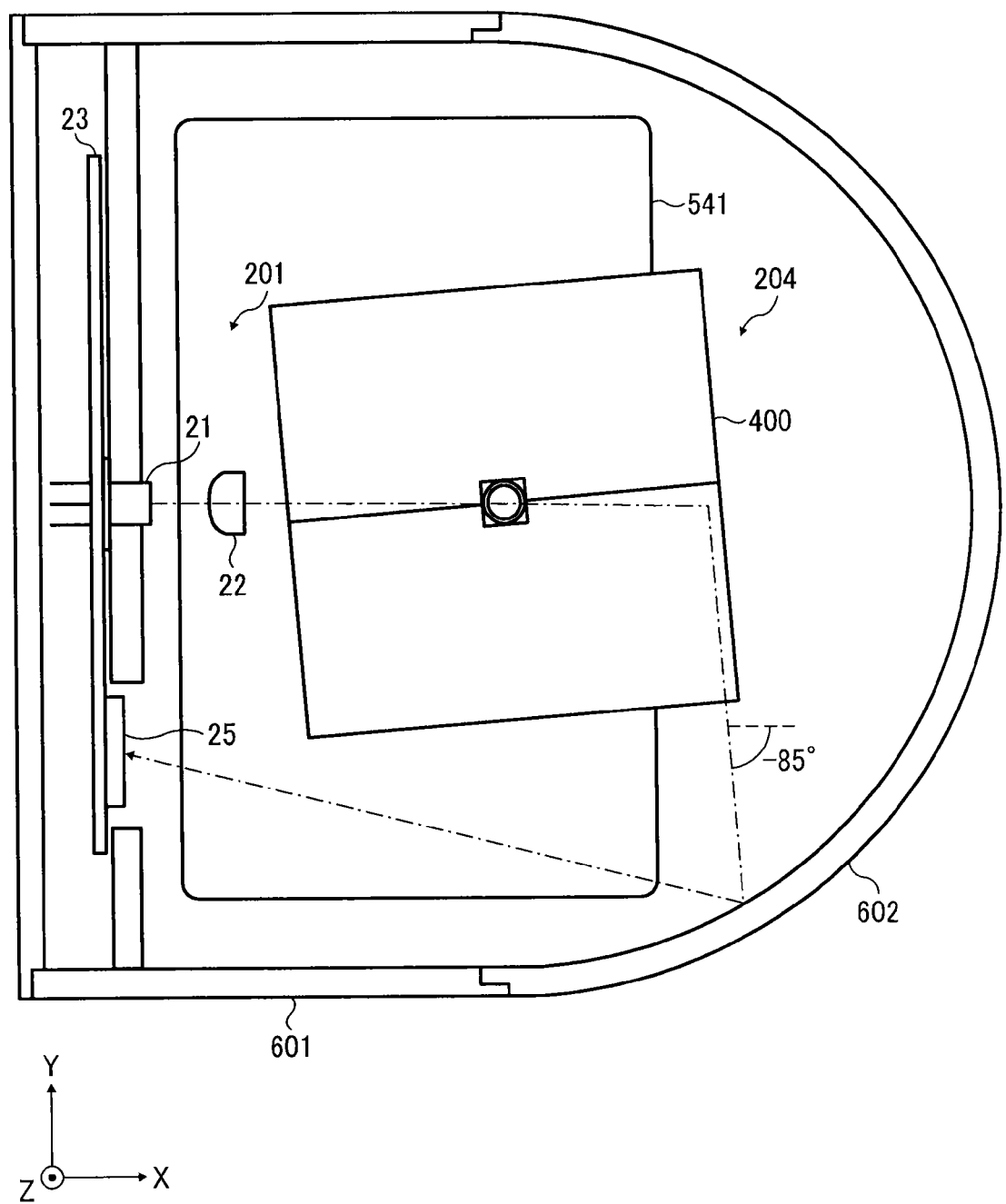
FIG. 13 illustrates synchronous detection according to an example embodiment of the present invention.

FIG. 13 illustrates the light emission system 201 and the light deflector 204 that are accommodated in a housing 601, according to the present example embodiment. The housing 601 has an opening on the +X side, and a covering member 602 is provided for the opening. The covering member 602 transmits a most of the light that is emitted from the light emission system 201, and reflects a part of the light that is emitted from the light emission system 201.

The light source 21 that is mounted on the circuit board 23 is attached to the housing 601. A synchronous light-receiving element 25 is also mounted on the circuit board 23. In the present example embodiment, it is designed such that the light reflected at the covering member 602 is received by the synchronous light-receiving element 25 when the projection angle is in the proximity of −85 degrees. The synchronous light-receiving element 25 outputs a signal to the object information acquisition unit 203 according to the amount of the received light. In the following description, the timing in which the light reflected at the covering member 602 is received by the synchronous light-receiving element 25 may be referred to as a "synchronization timing", for the purpose of simplification.

For every rotation of the rotor 400, the data of time t1 between a synchronization timing and a start timing of scanning, the data of time t2 between the start timing of scanning and an end timing of scanning, and the data of time t3 between the end timing of scanning and a start timing of synchronous detection are obtained in advance, and are stored in the memory of the object information acquisition unit 203.

Figure 14:
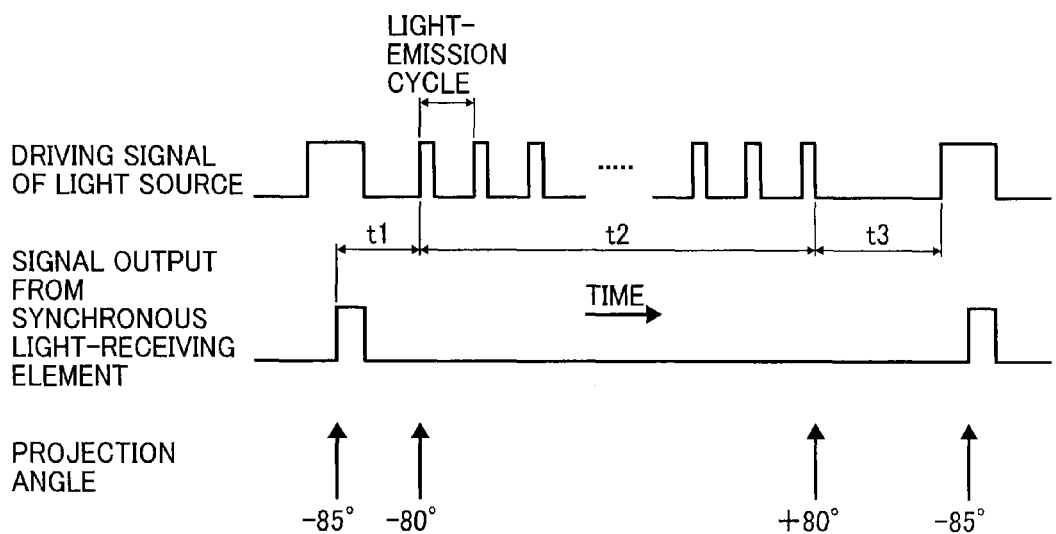
FIG. 14 is a timing chart indicating the driving signal output from a light source, according to an example embodiment of the present invention.

In the present example embodiment, the object information acquisition unit 203 starts the pulse light emission of the light source 21 when a synchronization timing is detected based on the output of the synchronous light-receiving element 25 and the time t1 has passed. Then, the object information acquisition unit 203 terminates the pulse light emission of the light source 21 when the time t2 has passed. Then, the object information acquisition unit 203 switches on the light source 21 when the time t3 has passed, and starts the detection of a synchronization timing. FIG. 14 is a timing chart of a driving signal of the light source 21, according to the present example embodiment.

When the light that is emitted from the light source 21 becomes diverging light after passing through the coupling lens 22, the dimension of the detection area in the Z-axis direction becomes greater as the distance from the laser radar 20 becomes greater.

When an object is present in the detection area, a part of the light that is emitted from the laser radar 20 and is reflected at the object returns to the laser radar 20. In the following description, the light that is reflected at the object and returns to the laser radar 20 may be referred to as "reflection light from an object", for the purpose of simplification.

When the detection light is the light that is reflected at the reflection plane 401*a*, the reflection light from an object enters the reflection plane 401*a*. On the other hand, when the detection light is the light that is reflected at the reflection plane 401*b*, the reflection light from an object enters the reflection plane 401*b*.

The reflection light from an object is deflected by the light deflector 204 so as to head for the mirror 205, and is reflected by the mirror 205. Accordingly, the light enters the photo-detection system 202.

Figure 15:
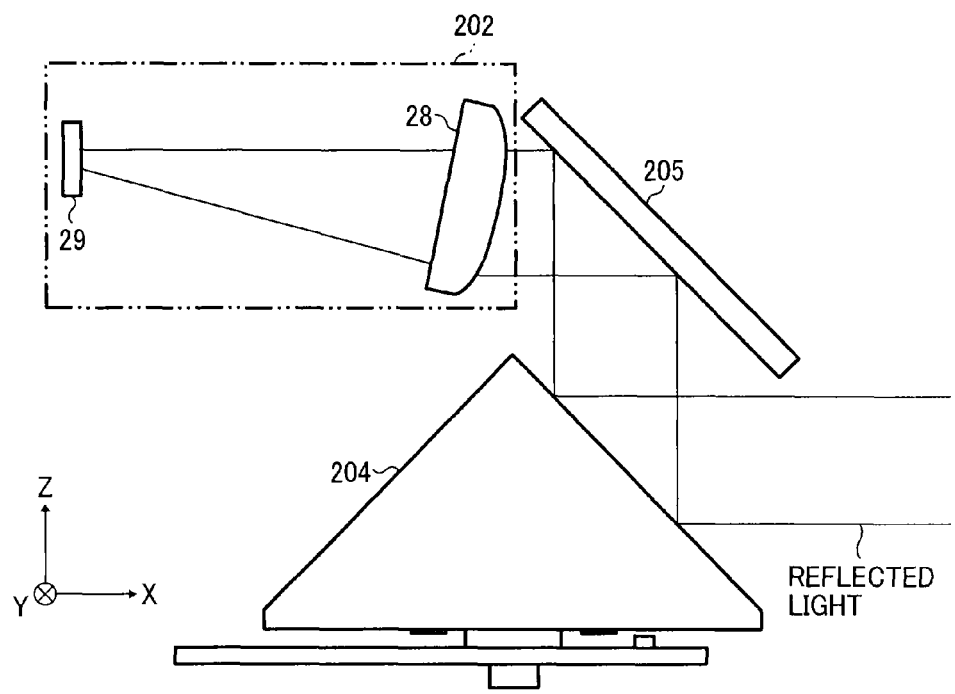
FIG. 15 illustrates a photo-detection system according to an example embodiment of the present invention.

As illustrated in FIG. 15, the photo-detection system 202 includes, for example, a condenser lens 28 and a photodetector 29.

The condenser lens 28 is disposed on the optical path of the light reflected by the mirror 205, and collects and condenses the light. In the present example embodiment, a planoconvex lens is used as the condenser lens 28.

Figure 16:
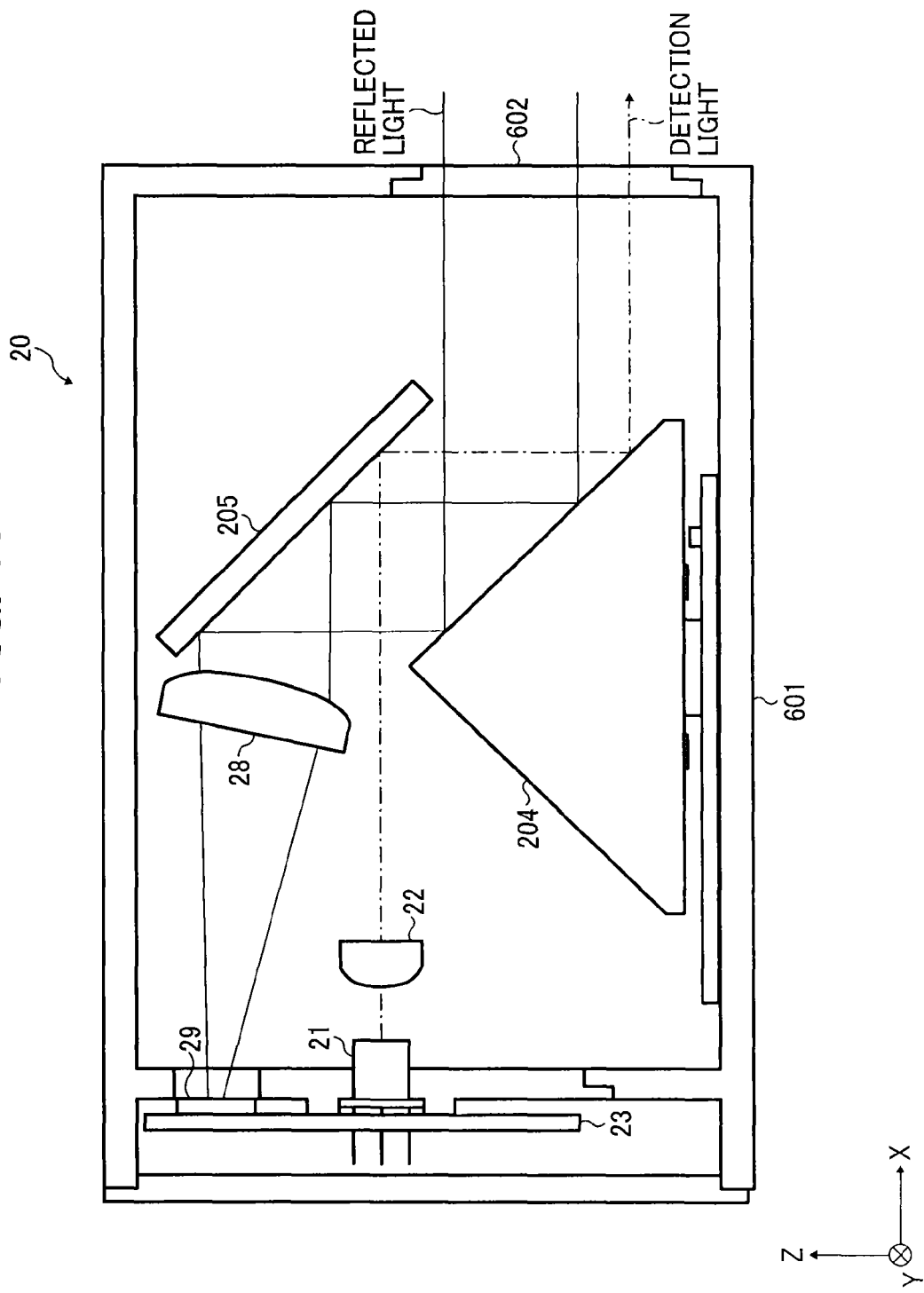
FIG. 16 illustrates a light emission system, a mirror, a light deflector, and a photo-detection system that are accommodated in a housing, according to an example embodiment of the present invention.

The photodetector 29 receives the light that has passed through the condenser lens 28, and outputs a signal to the object information acquisition unit 203 according to the amount of the received light. In the present example embodiment, as illustrated in FIG. 16 for example, the photodetector 29 is mounted on the circuit board 23.

As the light receiving element of the photodetector 29, a high-sensitivity photodiode (PD) such as an avalanche photo diode (APD) is used. Such a light receiving element is arranged in the proximity of the focal point of the condenser lens 28. In the present example embodiment, the downsizing of the light receiving element can be achieved.

In the present example embodiment, it is designed such that the position at which the reflection light from an object enters the reflection planes of the light deflector 204 is closer to the rotation axis of the light deflector 204 than the position at which the light that is emitted from the light emission system 201 and is reflected at the mirror 205 enters the reflection planes of the light deflector 204.

The object information acquisition unit 203 determines that the photodetector 29 has received reflection light from an object when the output level of the photodetector 29 is equal to or greater than a prescribed threshold. When it is determined that the photodetector 29 has received reflection light from an object, the object information acquisition unit 203 calculates the distance to the object based on the timing of light emission at the light source 21 and the timing of light reception at the photodetector 29. Further, the object information acquisition unit 203 obtains object information such as the position, dimension, and shape of the object, and stores the obtained object information in the memory 50.

As illustrated in FIG. 2, when there is an object ahead of the vehicle 1, the monitoring controller 40 determines whether or not the object has moved based on the object information stored in the memory 50, for every prescribed timing, and obtains the movement information of the object such as the moving direction and moving speed of the object when it is determined that the object has moved. Then, the monitoring controller 40 displays the object information and the movement information on the display 30.

Moreover, the monitoring controller 40 determines whether or not there is a danger based on the object information and the movement information. When it is determined that there is a danger, the monitoring controller 40 notifies the main controller of the vehicle 1 and the voice and alarm generator 60 of such a danger.

Figure 17:
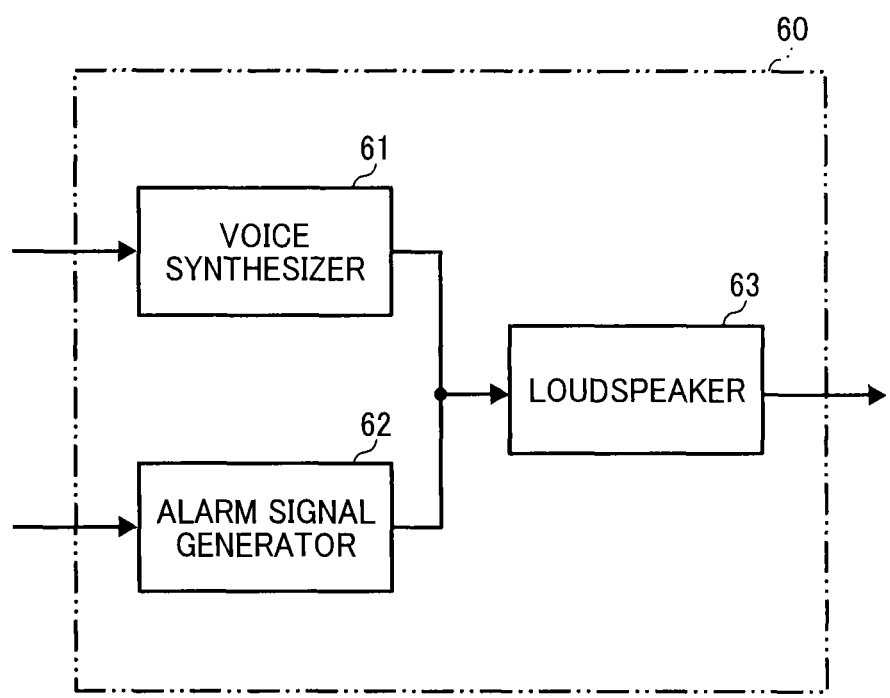
FIG. 17 is a block diagram illustrating the configuration of a voice and alarm generator according to an example embodiment of the present invention.

As illustrated in FIG. 17, the voice and alarm generator 60 includes, for example, a voice synthesizer 61, an alarm signal generator 62, and a loudspeaker 63.

The voice synthesizer 61 is provided with a plurality of pieces of voice data. When the presence of a danger is notified by the monitoring controller 40, the voice synthesizer 61 selects the corresponding piece of voice data and outputs the selected piece of voice data to the loudspeaker 63.

When the presence of a danger is notified by the monitoring controller 40, the alarm signal generator 62 generates the corresponding alarm signal and outputs the selected alarm signal to the loudspeaker 63.

Note that the number of revolutions of the rotor 400 is set to a fixed number of revolutions in range from a few hundreds of revolutions per minute (rpm) to several thousands of rpm. An appropriate light-emission cycle varies depending on the number of revolutions of the rotor 400, the resolution of the projection angle, and the maximum detectable distance.

FIG. 18 depicts examples of the light-emission cycle and light-emission frequency calculated by using the number of revolutions of the rotor 400 and the resolution of the projection angle as parameters, where the maximum detectable distance is two-hundred meters, according to the present example embodiment. As depicted in FIG. 18, an appropriate light-emission cycle becomes shorter as the number of revolutions of the rotor 400 is greater or the resolution of the projection angle is smaller.

For example, when the number of revolutions of the rotor 400 is 500 rpm and the resolution of the projection angle is 1 degree, the appropriate light-emission cycle is 333 µseconds, and the light-emission frequency is 3 kHz. When scanning is performed with the projection angle ranging from −80 degrees to +80 degrees, hundred and sixty one measured values can be obtained for every 1 degree by performing pulse light emission for every 333 µseconds.

Alternatively, for example, when the number of revolutions of the rotor 400 is 6000 rpm and the resolution of the projection angle is 0.25 degree, the appropriate light-emission cycle is 6.9 µseconds, and the light-emission frequency is 144 kHz. When scanning is performed with the projection angle ranging from −80 degrees to +80 degrees, six hundred and forty one measured values can be obtained for every 0.25 degree by performing pulse light emission for every 6.9 µseconds.

The number of revolutions of the rotor 400 and the resolution of the projection angle may be adjusted to any value according to usage.

Note that the rotor 400 needs to rotate at a fixed number of revolutions in order to control the light emission of the light source 21 and make the sequentially-obtained measured values correspond to the projection angle with reference to the synchronization timing.

For example, when the projection angle is in range from −80 degrees to +80 degrees and object detection over a range of 160 degrees is performed with the resolution of 0.25 degree, 0.25 degree corresponds to 0.156 percent (=0.25/160*100) of 160 degrees.

In the present example embodiment, an error in the projection angle needs to be reduced to about one-half of the position resolution. Accordingly, irregularities in rotation needs to be equal to or less than at least 0.078 percent. When the number of revolutions is small, the irregularities in rotation tend to be greater. In order to minimize the irregularities in rotation, it is desired that the number of revolutions be increased to a certain degree to gain inertia effect. In particular, equal to or greater than 2000 rpm is desired for the number of revolutions of the rotor 400.

When the number of revolutions of the rotor 400 is large, the number of detections per unit time increases and the accuracy of detection improves. In order to improve the accuracy of detection, again, equal to or greater than 2000 rpm is desired for the number of revolutions of the rotor 400.

Conventionally, an increased number of revolutions tends to result in an increase in imbalance oscillation, which is inconvenient. By contrast, in the rotor 400 according to the present example embodiment, a plurality of reflection planes are oblique to the rotation axis and are formed so as to be rotationally symmetrical where the relative positions of the reflection planes with reference to the Z-axis direction are the same. Accordingly, dynamic balancing of the rotor 400 becomes easily, and the rotor 400 can rotate at high speed.

For example, it is assumed that the rotor 400 is a set of thin rotor plates that are split along the rotation axis direction. In this configuration, it is desired that the barycenter of each of the split thin rotor plates coincide with that of the rotation axis. If there is a thin rotor plate whose barycenter does not coincide with the barycenter of the rotation axis, imbalance oscillation occurs when the rotor 400 rotates. The dynamic balancing is performed in order to prevent imbalance oscillation by correcting the balance of the mass of the rotor 400.

The term "dynamic balancing" is described in detail in "Rotating machines—Balance quality requirements of rigid rotors" in Japanese Industrial Standards (JIS) B 0905-1992.

In the known art, the dynamic balancing sets two plates to be corrected that are apart from each other with reference to the axis direction, and adds mass to the two plates to be corrected or removes mass from the two plates to be corrected so as to correct imbalance in the mass that causes imbalance oscillation. When the number of the thin rotor plates whose barycenter does not coincide with that of the rotation axis is large among the thin rotor plates that are split along the rotation axis direction, mass needs to be added to these plates or mass needs to be removed from these plates for correction to a large degree.

As the rotor 400 according to the present example embodiment has no thin rotor plate whose barycenter does not coincide with that of the rotation axis among thin rotor plates that are split along the rotation axis direction, mass does not need to be added to these plates or mass does not need to be removed from these plates for correction to a large degree. Accordingly, dynamic balancing is easy.

According to the example embodiment, downsizing of the light deflector 204 is achieved even when the rotor 400 is rotated at equal to or faster than 2000 rpm, compared with cases in which the reflection planes are arranged parallel to the rotation axis and the light enters the reflection planes horizontally. As a result, windage loss and turbulent flow around the rotor 400 can be reduced, and the power consumption and irregularities in rotation are minimized.

As described above, the laser radar 20 according to the present example embodiment includes, for example, the light emission system 201, the mirror 205, the light deflector 204, the photo-detection system 202, and the object information acquisition unit 203.

The light emission system 201 includes, for example, the light source 21 and the coupling lens 22. The photo-detection system 202 includes, for example, the condenser lens 28 and the photodetector 29.

The light deflector 204 has a plurality of reflection planes that rotate on the rotation axis, and these reflection planes are oblique to the rotation axis and are rotationally symmetrical about the rotation axis.

In the present example embodiment, dynamic balancing of the rotor 400 of the light deflector 204 is easy, and thus the rotor 400 can rotate at high speed while maintaining the accuracy of detection. Accordingly, the length of time required to perform scanning one time can be shortened.

Moreover, downsizing of the light deflector 204 is achieved by making the reflection planes of the rotor 400 oblique to the rotation axis, compared with cases in which the reflection planes are arranged parallel to the rotation axis and the light enters the reflection planes horizontally. As a result, windage loss and turbulent flow around the rotor 400 can be reduced, and the power consumption and irregularities in rotation can be reduced.

In the present example embodiment, it is designed such that the light that is emitted from the light emission system 201 and then is reflected at the mirror 205 enters the reflection planes of the light deflector 204 in the direction parallel to the rotation axis. Accordingly, the detection light that is parallel to the XY plane can be emitted from the laser radar 20 with any projection angle, and the accuracy of detection with reference to the Z-axis direction improves.

With the laser radar 20 according to the present example embodiment, the detection speed can be increased without reduction in the accuracy of detection.

Moreover, it may be designed such that the position at which the light that is emitted from the light emission system 201 and is reflected at the mirror 205 enters the reflection planes of the light deflector 204 is on the −Z side with reference to the position at which the reflection light from an object enters the reflection planes of the light deflector 204. In such cases, the range of the rotation angle of the rotor 400 in which the light emitted from the light source 21 and enters the light deflector 204 can reflect with a single reflection plane increases, and the scanning angle is widened.

The line of intersection of the neighboring two reflection planes among the reflection planes of the light deflector 204 may be orthogonal to the rotation axis. In such cases, the range of the rotation angle of the rotor 400 in which the light emitted from the light source 21 and enters the light deflector 204 can reflect with a single reflection plane increases, and the scanning angle is widened.

The object information acquisition unit 203 acquires object information including the distance to the object, based on the timing of light emission at the light source 21 and the timing of light reception at the photodetector 29. According to the example embodiment, object information can accurately be acquired within a short period of time.

With the monitoring apparatus 10 according to the present example embodiment, the provision of the laser radar 20 enables accurate acquisition of the object information and movement information at high speed.

[First Modification]

Figure 19:
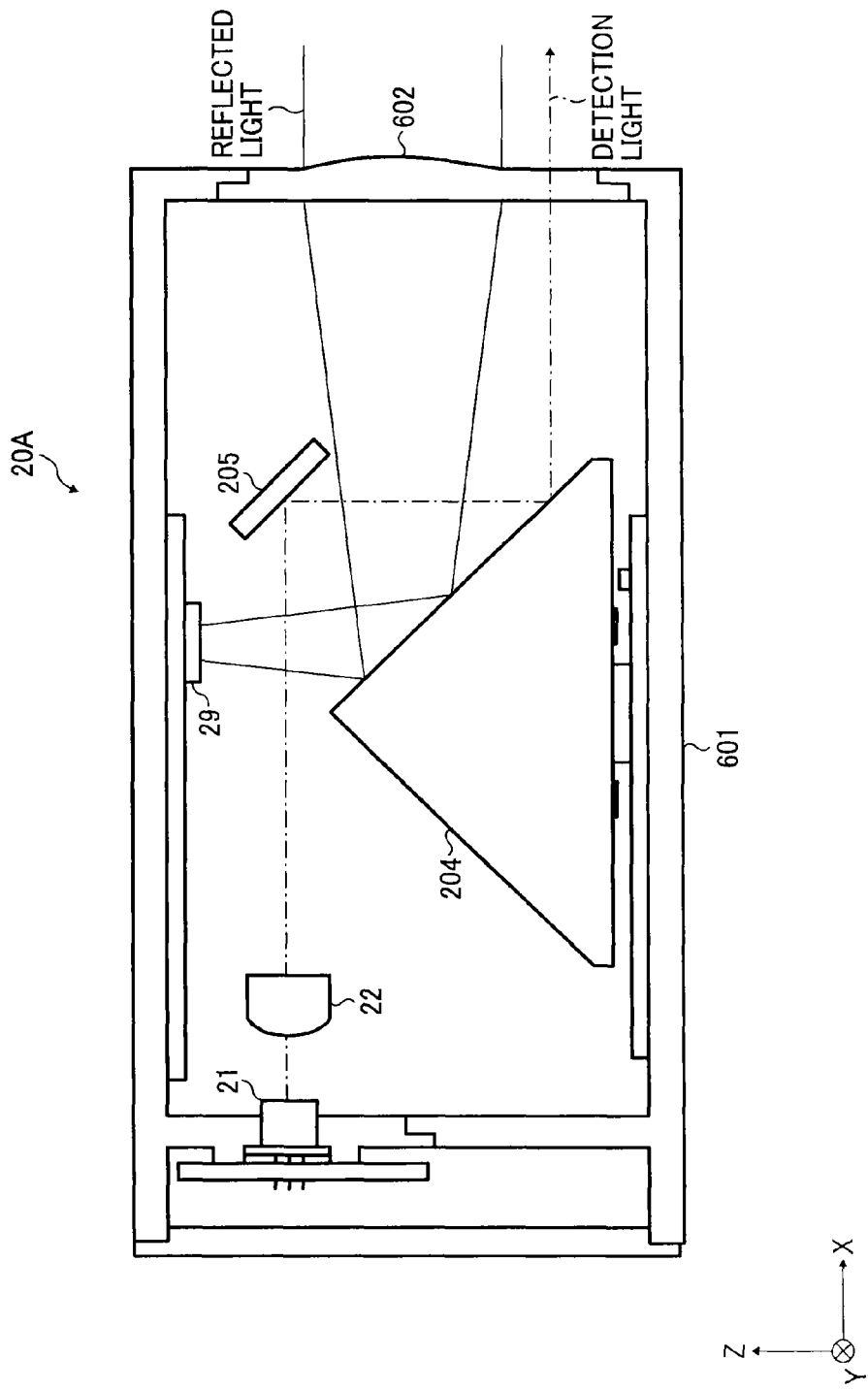
FIG. 19 illustrates a first modification (1) of the laser radar of FIG. 16.

FIG. 19 illustrates a laser radar 20A according to a first example modification of the example embodiment described above. The laser radar 20A is different from the laser radar 20 according to the example embodiment described above, in the configuration of the photo-detection system 201 and the covering member 602.

In laser radar 20A, the covering member 602 includes a portion with light-gathering function and a portion without light-gathering function.

Figure 20:
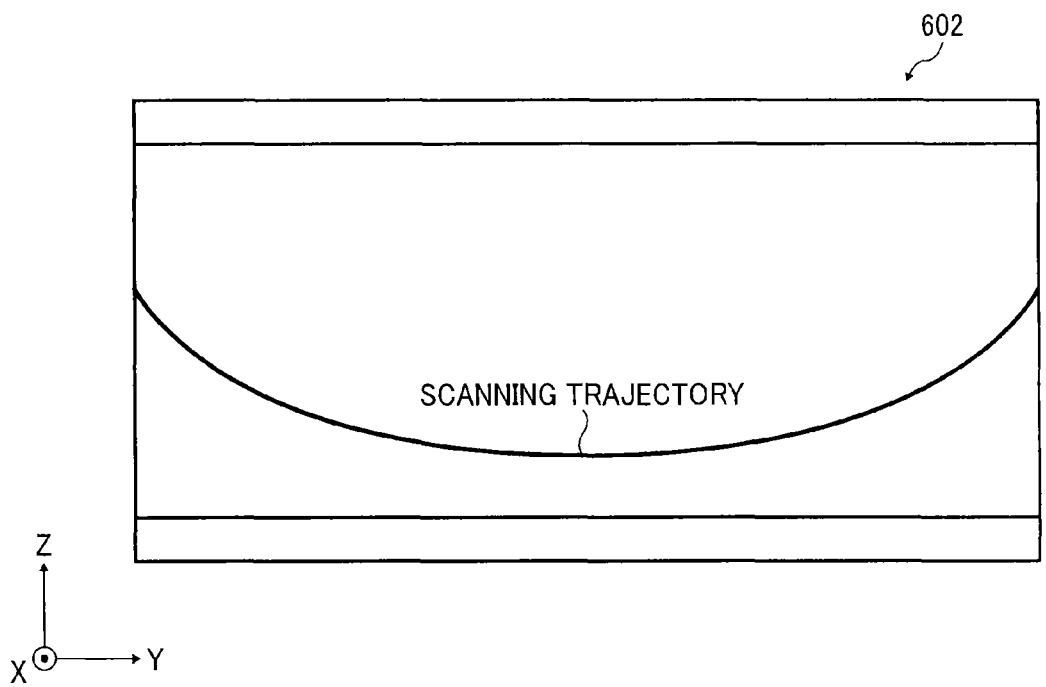
FIG. 20 illustrates the scanning trajectory followed by the laser radar according to the first modification of the present invention.
Figure 21:
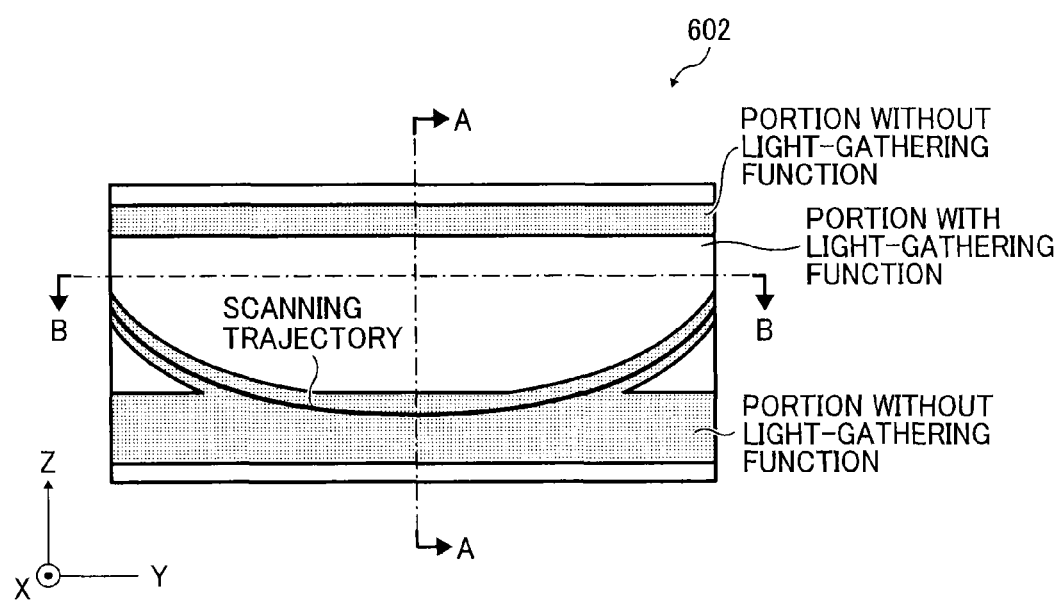
FIG. 21 illustrates a covering member of the laser radar according to the first modification of the present invention.
Figure 22:
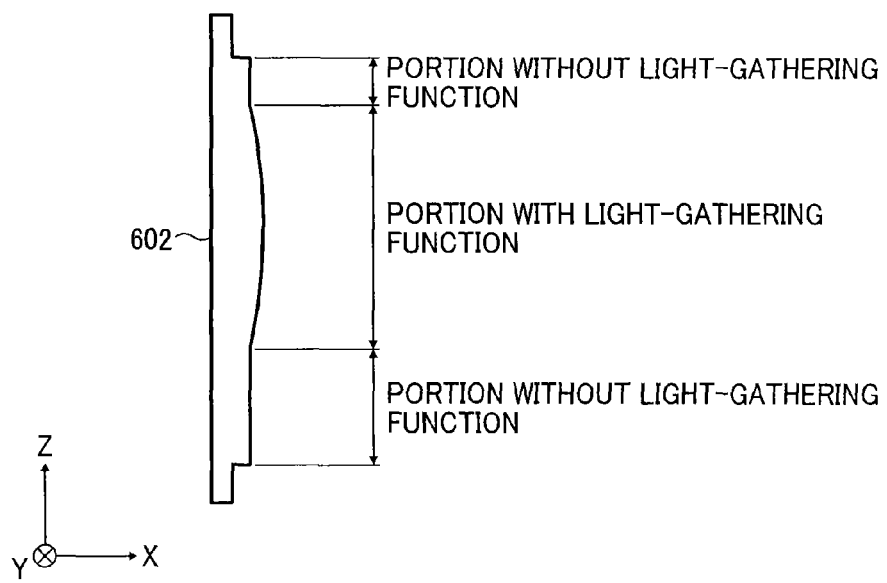
FIG. 22 is a sectional view A-A of FIG. 21, according to the first modification of the present invention.
Figure 23:
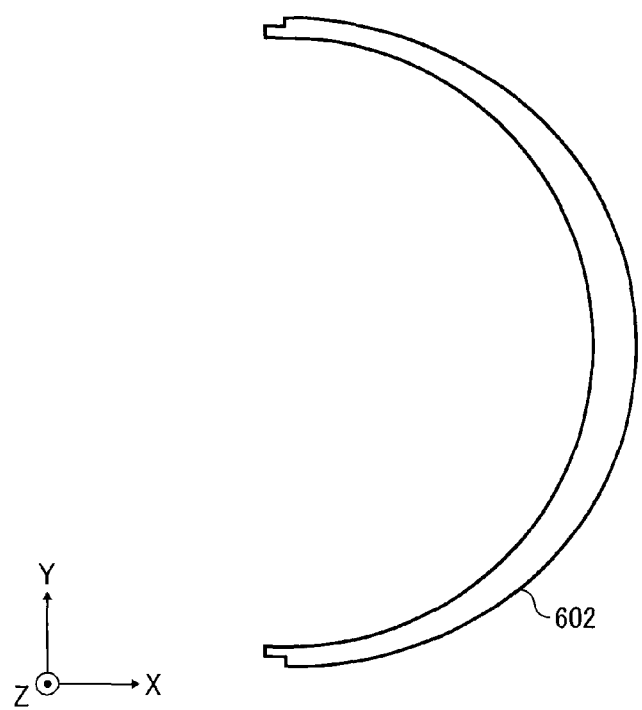
FIG. 23 is a sectional view B-B of FIG. 21, according to the first modification of the present invention.

FIG. 20 illustrates the trajectory followed by the position at which detection light enters the covering member 602. This trajectory may be referred to as "scanning trajectory" in the following description. FIG. 21 illustrates an example configuration in which detection light passes through the portion of the covering member 602 without light-gathering function. According to the present example modification, the detection light is prevented from being dispersed or refracted to unwanted direction by the covering member 602. FIG. 22 is a sectional view A-A of FIG. 21, according to the present example modification. FIG. 23 is a sectional view B-B of FIG. 21, according to the present example modification.

The portion with light-gathering function has uneven thickness in the Z-axis direction and Y-axis direction. By contrast, the portion without light-gathering function has almost even thickness. The covering member 602 is integrally molded using a resin material.

On the other hand, most of the reflection light from an object passes through the portion with light-gathering function. Due to this configuration, the condenser lens 28 is no longer needed in the photo-detection system 201. Moreover, the reflection light from the object that is deflected by the light deflector 204 can directly be received by the photodetector 29 without being reflected by the mirror 205. Accordingly, the mirror 205 can be downsized. As a result, the housing 601 can also be downsized.

[Second Modification]

Figure 24:
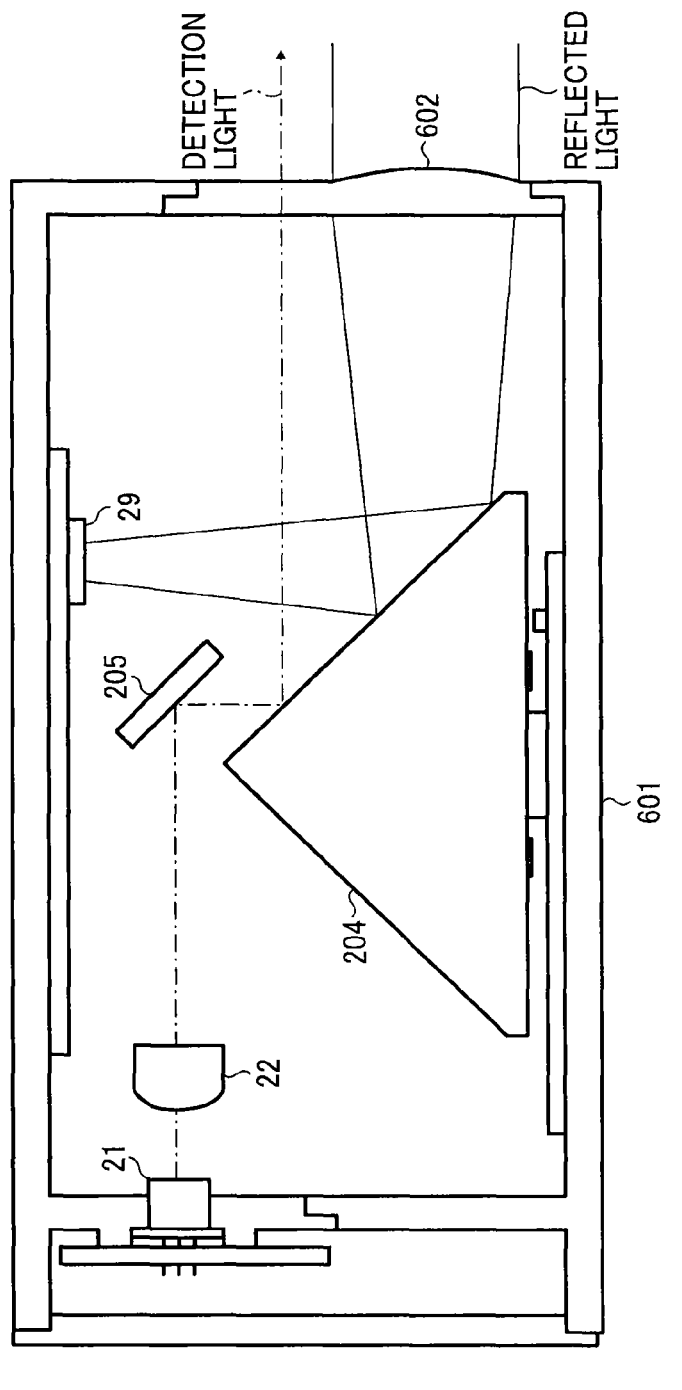
FIG. 24 illustrates a second modification of the laser radar of FIG. 16.

FIG. 24 illustrates a laser radar 20B according to a second example modification of the example embodiment described above. The laser radar 20B is different from the laser radar 20A according to the first example modification described above, in the position at which the light emitted from the light emission system 201 and then is reflected at the mirror 205 enters the reflection planes of the light deflector 204.

In the laser radar 20B, it is designed such that the position at which the light that is emitted from the light emission system 201 and is reflected at the mirror 205 enters the reflection planes of the light deflector 204 is on the +Z side with reference to the position at which the reflection light from an object enters the reflection planes of the light deflector 204.

Figure 25:
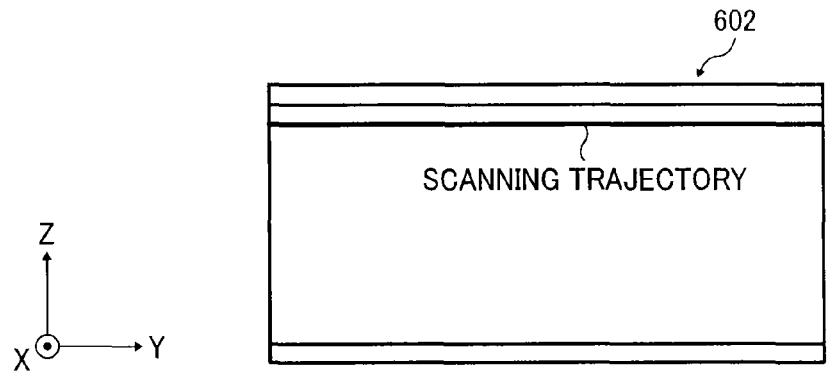
FIG. 25 illustrates the scanning trajectory followed by the laser radar according to the second modification of the present invention.

FIG. 25 illustrates the scanning trajectory followed by the detection light in the covering member 602. In this configuration, variations in the position of the detection light with reference to the Z-axis direction can be minimized.

Figure 26:
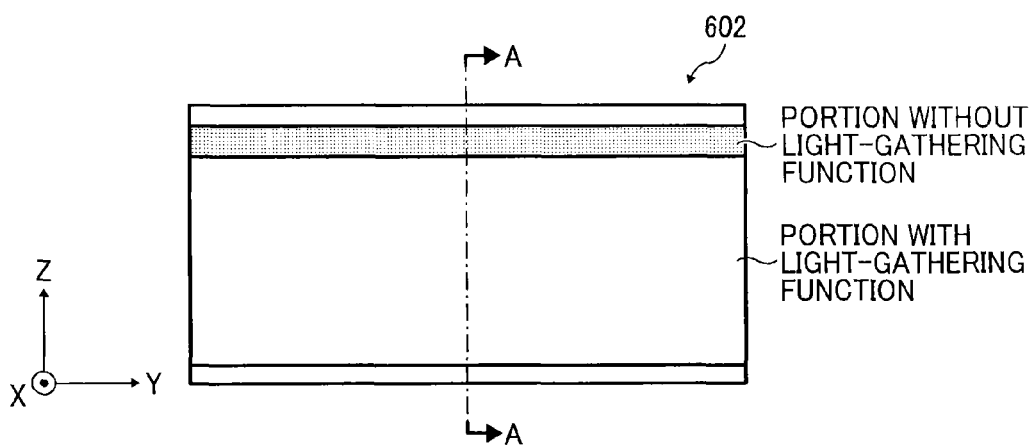
FIG. 26 illustrates a covering member of the laser radar according to the second modification of the present invention.
Figure 27:
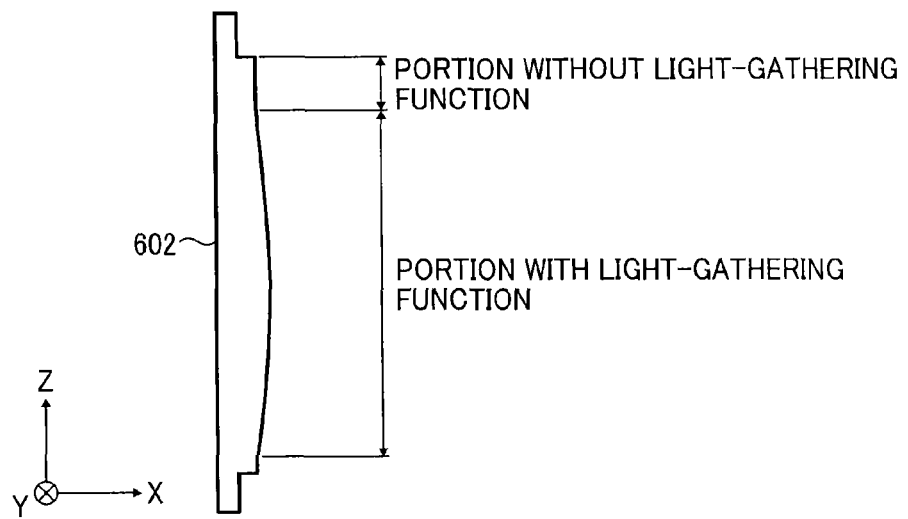
FIG. 27 is a sectional view A-A of FIG. 26, according to the second modification of the present invention.

FIG. 26 illustrates the portion without light-gathering function and the portion with light-gathering function of the covering member 602. FIG. 27 is a sectional view A-A of FIG. 26, according to the second example modification. As illustrated in FIG. 27, the shape of the covering member 602 can be simplified with the configuration according to the second example modification.

According to the present example modification, the area through which the light reflected at an object passes through is easily separated from the area through which the detection light passes through in the covering member 602. In this configuration, loss of the light quantity of the detection light that reaches the photodetector 29 after being reflected at the object can be minimized.

Note that the scanning angle of the laser radar 20B is slightly smaller than that of the laser radar 20 and the laser radar 20A.

[Third Modification]

A laser radar 20C according to a third example modification of the example embodiment described above is different from the laser radar 20 according to the example embodiment described above, in the configuration of the light source 21. A surface emitting laser array having a two-dimensionally arranged plurality of light-emitting units is used for the light source 21 of the laser radar 20C, instead of the end-surface emitting laser described above.

In the surface emitting laser array, a few hundred to several thousand light-emitting units (surface emitting lasers) are integrated into an area of a few square millimeters. In the present example modification, a plurality of light-emitting units are grouped, and each group may be referred to as a "group of light-emitting units". The light source 21 includes a plurality of groups of light-emitting units. Switching on and switching off of the light-emitting units are performed in a unit of each group of light-emitting units.

Firstly, a plurality of groups of light-emitting units that are placed at different positions of the light source 21 with reference to the Y-axis direction are described.

Figure 28A:
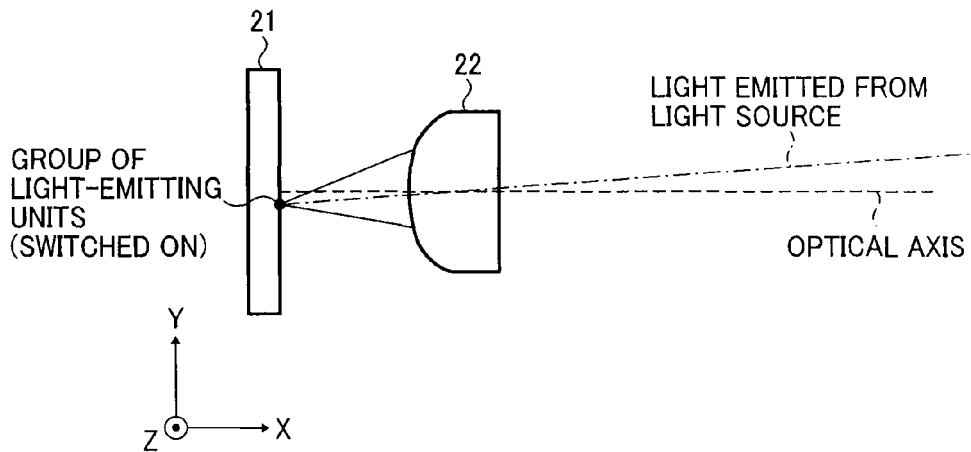
FIGS. 28A to 28C each illustrate a third modification (1) of the laser radar of FIG. 16.

As illustrated in FIG. 28A, a group of light-emitting units that is placed on the −Y side of the Y-axis direction with reference to the optical axis of the coupling lens 22 is switched on, the traveling direction of the light that has passed through the coupling lens 22 becomes oblique with reference to the X-axis direction.

Figure 28B:
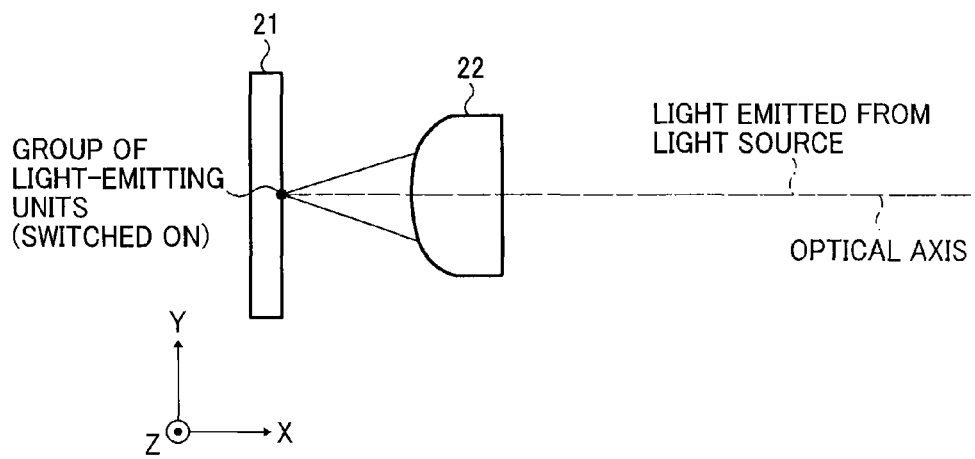

As illustrated in FIG. 28B, a group of light-emitting units that is placed on the optical axis of the coupling lens 22 with reference to the Y-axis direction is switched on, the traveling direction of the light that has passed through the coupling lens 22 becomes parallel to the X-axis direction.

Figure 28C:
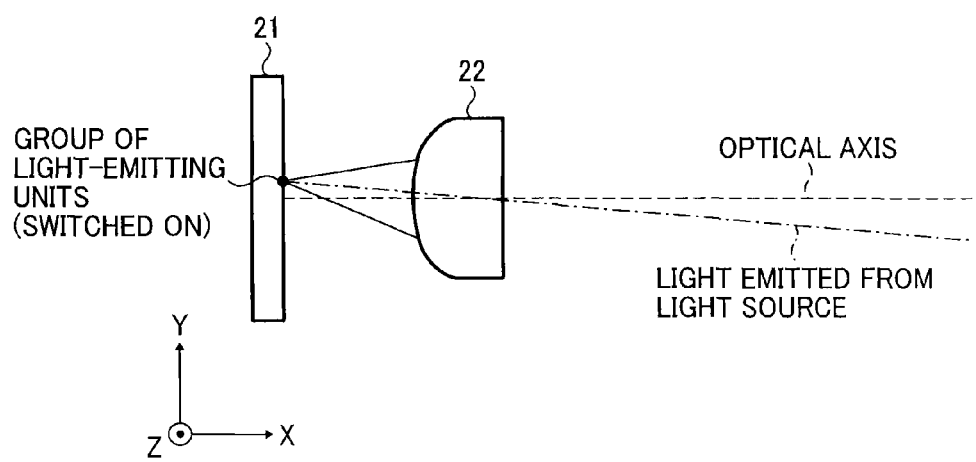

As illustrated in FIG. 28C, a group of light-emitting units that is placed on the +Y side of the Y-axis direction with reference to the optical axis of the coupling lens 22 is switched on, the traveling direction of the light that has passed through the coupling lens 22 becomes oblique with reference to the X-axis direction, in the direction opposite to that of FIG. 28A.

Secondly, a plurality of groups of light-emitting units that are placed at different positions of the light source 21 with reference to the Z-axis direction are described.

Figure 29A:
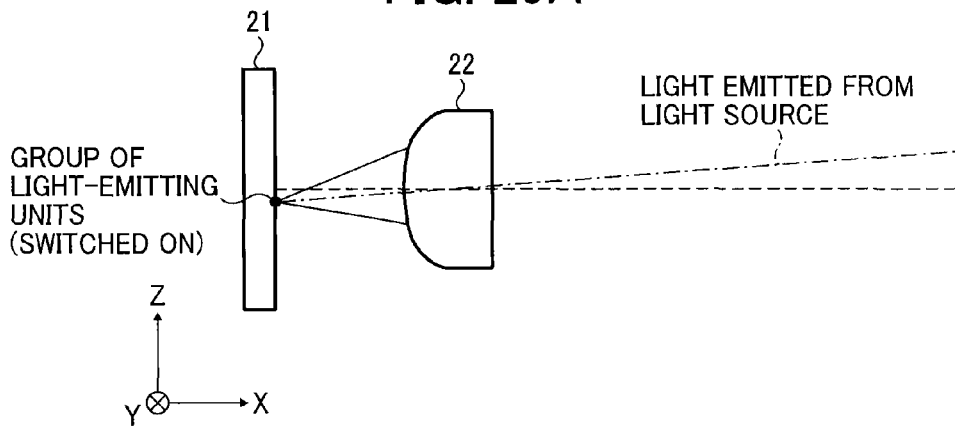
FIGS. 29A to 29C each illustrate a third modification (2) of the laser radar of FIG. 16.

As illustrated in FIG. 29A, a group of light-emitting units that is placed on the −Z side of the Z-axis direction with reference to the optical axis of the coupling lens 22 is switched on, the traveling direction of the light that has passed through the coupling lens 22 becomes oblique with reference to the X-axis direction.

Figure 29B:
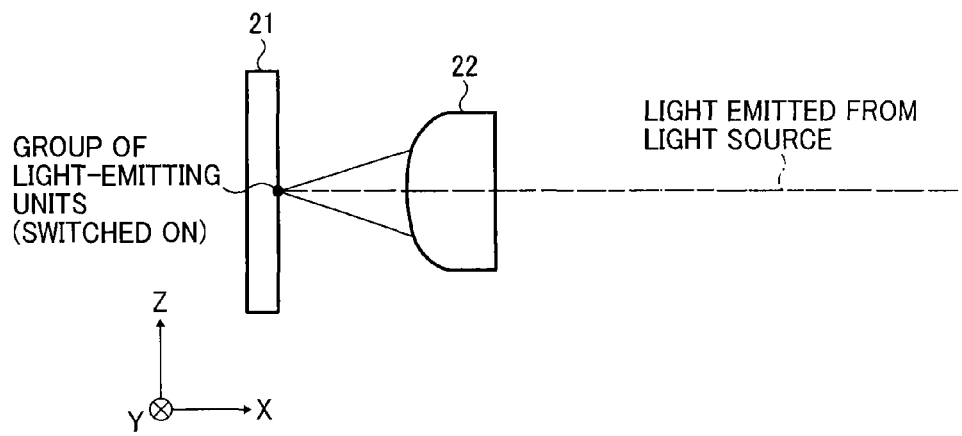

As illustrated in FIG. 29B, a group of light-emitting units that is placed on the optical axis of the coupling lens 22 with reference to the Z-axis direction is switched on, the traveling direction of the light that has passed through the coupling lens 22 becomes parallel to the X-axis direction.

Figure 29C:
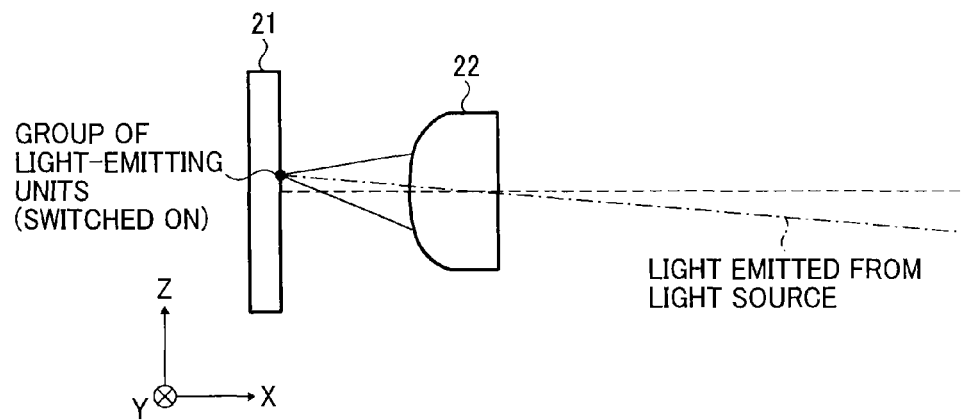

As illustrated in FIG. 29C, a group of light-emitting units that is placed on the −Z side of the Z-axis direction with reference to the optical axis of the coupling lens 22 is switched on, the traveling direction of the light that has passed through the coupling lens 22 becomes oblique with reference to the X-axis direction, in the direction opposite to that of FIG. 29A.

The size (absolute value) of the tilt angle which the light that has passed through the coupling lens 22 forms with the X-axis direction (i.e., the traveling direction of the light) becomes greater as the position of the groups of the switched-on light-emitting units becomes distant from the optical axis of the coupling lens 22.

The variations in the tilt angle due to the position of the group of light-emitting units can be adjust to some extent by the focal length of the coupling lens 22, the variations in the tilt angle are controlled to about 1 to 2 degrees.

The object information acquisition unit 203 selectively switches on some of the groups of light-emitting units in synchronization with the rotation of the rotor 400.

Figure 30:
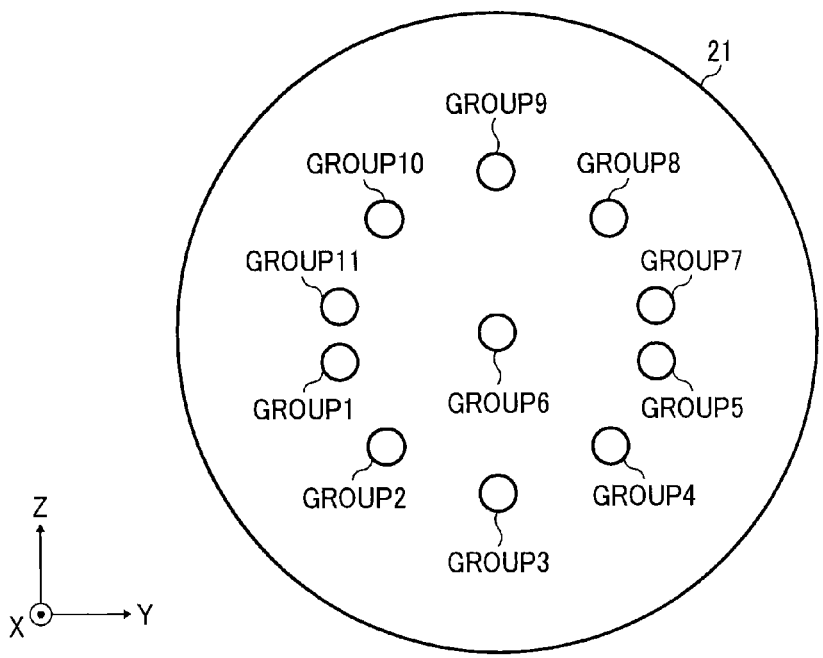
FIG. 30 illustrates an example of the surface emitting laser array used in the laser radar according to the third modification of the present invention.
Figure 31:
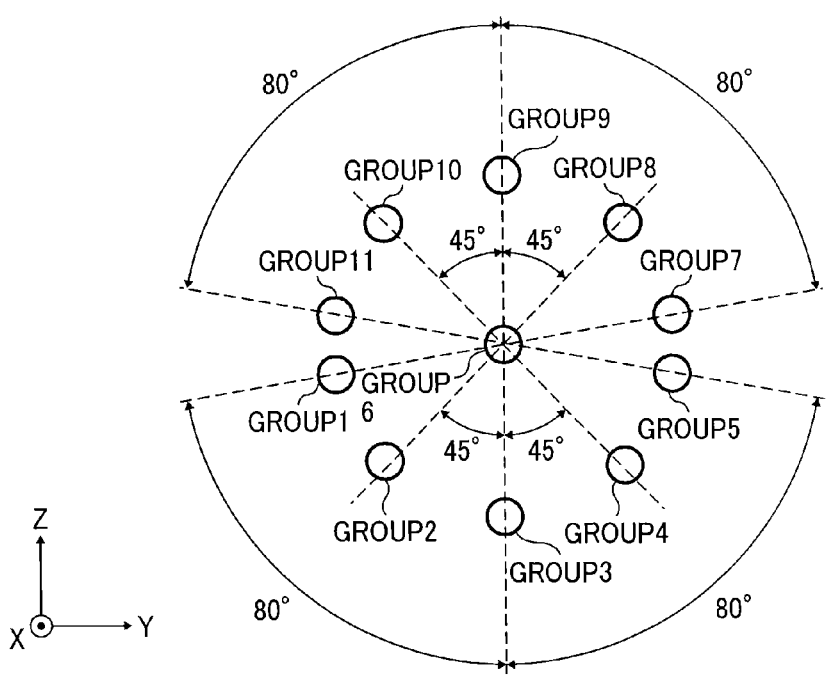
FIG. 31 illustrates the relative positions of the centers of a plurality of groups of light-emitting units in a surface emitting laser array, according to an example embodiment of the present invention.
Figures 32, 33:
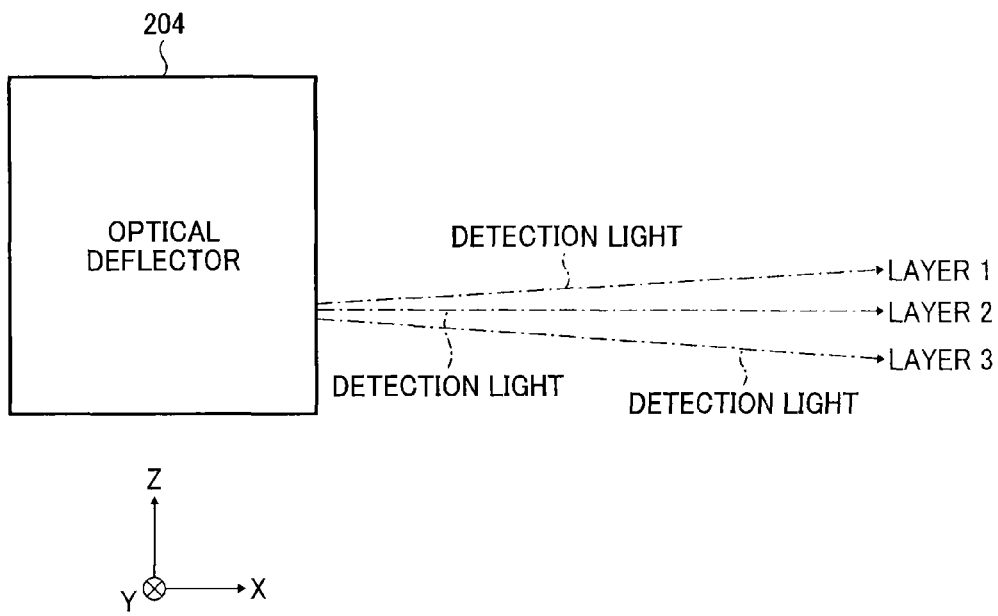
FIG. 32 illustrates layer 1 to layer 3 according to an example embodiment of the present invention.
FIG. 33 illustrates the relationship between the selected group of light-emitting units and layer 1 to layer 3, according to an example embodiment of the present invention.

FIG. 30 illustrates an example of the surface emitting laser array used in the laser radar according to the third modification of the present invention. The surface emitting laser array includes eleven groups of light-emitting units (groups 1 to 11). FIG. 31 illustrates the relative positions of the groups of light-emitting units in the center. The group 6 is arranged in the center of the all groups of light-emitting units, and is on the optical axis of the coupling lens 22. As illustrated in FIG. 32 for example, is assumed that the detection area is composed of three layers (i.e., layer 1, layer 2, and layer 3) divided in the Z-axis direction.

For example, when the detection area is the layer 1, the switched-on group of light-emitting units is switched in the listed order of the group 1, group 2, group 3, group 4, and group 5 as the projection angle changes in the listed order of −80 degrees, −45 degrees, 0 degree, +45 degrees, and +80 degrees (see FIG. 33). In other words, the groups of light-emitting units that are placed on the −Z side with reference to the optical axis of the coupling lens 22 are sequentially switched on in a counterclockwise direction around the center of the all groups of light-emitting units.

When the detection area is the layer 2, the switched-on group of light-emitting units is only the group 6 even when the projection angle changes in the listed order of −80 degrees, −45 degrees, 0 degree, +45 degrees, and +80 degrees (see FIG. 33). In other words, the group of light-emitting units that is arranged in the center of the all groups of light-emitting units is switched on continuously.

When the detection area is the layer 3, the switched-on group of light-emitting units is switched in the listed order of the group 7, group 8, group 9, group 10, and group 11 as the projection angle changes in the listed order of −80 degrees, −45 degrees, 0 degree, +45 degrees, and +80 degrees (see FIG. 33). In other words, the groups of light-emitting units that are placed on the +Z side with reference to the optical axis of the coupling lens 22 are sequentially switched on in a counterclockwise direction around the center of the all groups of light-emitting units.

In the present example modification, cases in which the surface emitting laser array includes eleven groups of light-emitting units were described for the purposes of simplification. However, no limitation is indicated thereby.

Next, cases in which only the group 3 is switched on when the detection area is the layer 1, only the group 6 is switched on when the detection area is the layer 2, and only the group 9 is switched on when the detection area is the layer 3 are described by way of example. In such cases, as long as the projection angle is about 0 degree, the irradiation positions of the detection light on the layer 1, layer 2, and layer 3 are separate from each other, and object detection on different positions with reference to the Z-axis direction can be performed.

However, as the absolute value of the projection angle increases, the irradiation position of the detection light on the layer 1 gets close to the irradiation position of the detection light on the layer 2. When the absolute value of the projection angle is 80 degrees, the irradiation position of the detection light on the layer 1 overlaps with the irradiation position of the detection light on the layer 2. In a similar manner, as the absolute value of the projection angle increases, the irradiation position of the detection light on the layer 3 gets close to the irradiation position of the detection light on the layer 2. When the absolute value of the projection angle is 80 degrees, the irradiation position of the detection light on the layer 3 overlaps with the irradiation position of the detection light on the layer 2. In such cases, it is difficult to perform object detection on different positions with reference to the Z-axis direction.

A multilayer object detection in which detection can be performed on a plurality of positions with reference to the Z-axis direction becomes possible by switching the groups of light-emitting units in synchronization with the rotation of the rotor 400.

In the example embodiments described above, cases in which the rotor 400 includes two reflection planes were described. However, no limitation is indicated thereby. For example, the rotor 400 may include three or more reflection planes. In such cases, these reflection planes are oblique to the rotation axis and are rotationally symmetrical about the rotation axis, and the heights of these reflection planes in the rotation axis direction are equal to each other.

In the example embodiments described above, cases in which the two reflection planes of the rotor 400 are oblique to the rotation axis by 45 degrees were described. However, no limitation is indicated thereby. When the rotor 400 includes a plurality of reflection planes, for example, all the reflection planes may have angles other than 45 degrees, or some of the reflection planes may have angles other than 45 degrees.

When the reflection planes have different tilt angles, object detection can be performed on a plurality of positions with reference to the rotation axis direction even if the number of light-emitting units or the number of groups of light-emitting units on the light source 21 is just one.

Figure 34:
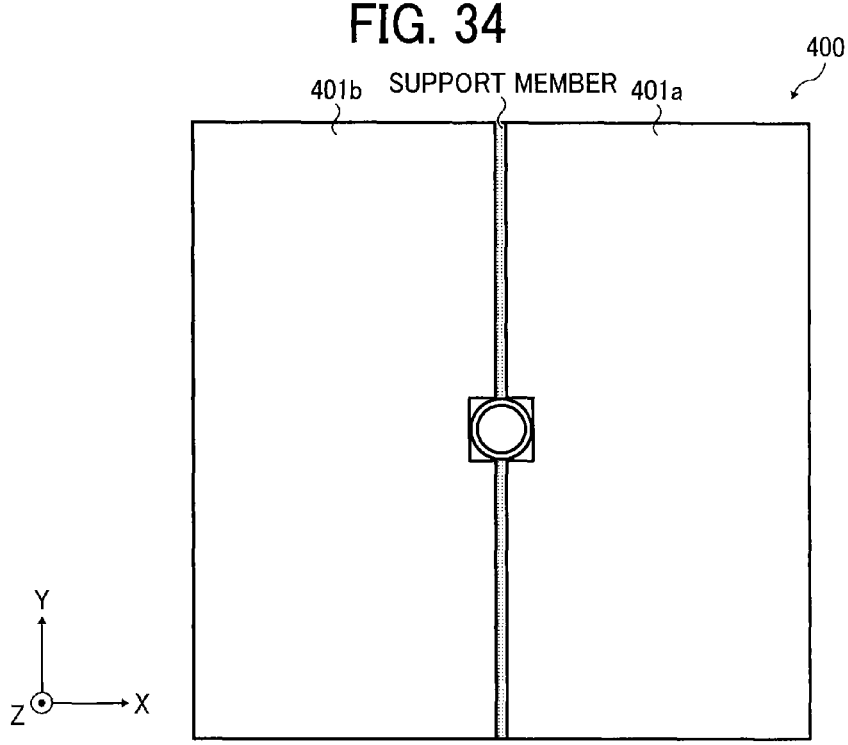
FIG. 34 illustrates a support member (1) according to an example embodiment of the present invention.
Figure 35:
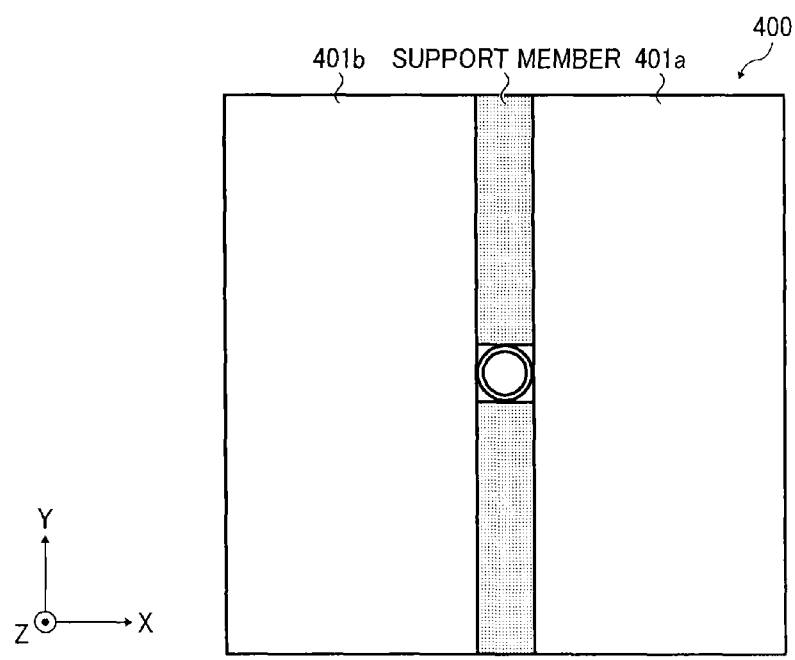
FIG. 35 illustrates a support member (2) according to an example embodiment of the present invention.

In the example embodiments described above, cases in which the edges of two reflection planes on the +Z side directly contact one another were described. However, no limitation is indicated thereby. For example, as illustrated in FIG. 34, the edges of two reflection planes on the +Z side may contact one another via a support member. However, when the supporting member is too wide as illustrated in FIG. 35, the scanning angle becomes narrow. For this reason, it is desired that the width of the supporting member be smaller.

In the example embodiments described above, the monitoring controller 40 may perform some of the processes of the object information acquisition unit 203, and the object information acquisition unit 203 may perform some of the processes of the monitoring controller 40.

In the example embodiments described above, cases in which the monitoring apparatus 10 includes a single laser radar 20 were described. However, no limitation is indicated thereby. For example, the monitoring apparatus 10 may include a plurality of laser radars 20 according to the size of a vehicle or the monitoring area.

In the example embodiments described above, cases in which the laser radar 20 is provided for the monitoring apparatus 10 that monitors the view in the traveling direction of the vehicle were described. However, no limitation is indicated thereby. For example, the laser radar 20 may be provided for an apparatus that monitors the rear view or side view of the vehicle.

The laser radar 20 may be provided for any device or apparatus other than vehicles to serve as a sensing apparatus.

In such cases, the monitoring controller 40 outputs alarm information that meets the purposes of the sensing.

The laser radar 20 may be used only for detecting the presence of an object.

The laser radar 20 may be used, for example, for rangefinders or shape measuring apparatuses that are different from sensing apparatuses.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:

1. An object detector, comprising:
   a light source;
   a light deflector configured to deflect light emitted from the light source; and
   a photodetector configured to detect the light that is deflected by the light deflector and then is reflected at an object, wherein
   the light deflector includes a plurality of reflection planes that rotate on a rotation axis,
   the reflection planes are oblique to the rotation axis and are rotationally symmetrical about the rotation axis,
   the light that is emitted from the light source enters the light deflector in a direction parallel to the rotation axis,
   the light that is reflected at the object is deflected by the light deflector and then is detected by the photodetector, and
   a position at which the light that is emitted from the light source enters the light deflector is closer to a center of rotation of the reflection planes than a position at which the light reflected at the object enters the light deflector.

2. The object detector according to claim 1, wherein a line of intersection of neighboring two of the reflection planes has a direction orthogonal to the rotation axis.

3. The object detector according to claim 1, further comprising:
   a housing that accommodates the light source, the light deflector, and the photodetector, and has a window covered by a light-transmissive cover, wherein
   a portion of the cover through which the light reflected at the object passes has a light-gathering function, and
   a portion of the cover through which the light emitted from the light source and deflected by the light deflector passes has no light-gathering function.

4. The object detector according to claim 1, wherein
   the reflection planes are formed on a surface of a rotor, and
   the rotor has inner space in which a driving unit for rotating the rotor is accommodated.

5. The object detector according to claim 1, wherein a tilt angle which the reflection planes form with the rotation axis is 45 degrees.

6. A sensing apparatus, comprising:
   the object detector according to claim 1, and
   a monitoring controller configured to determine whether or not an object is present, and obtain movement information of the object including at least one of a moving direction and a moving speed of the object, based on an output from the object detector.

7. The sensing apparatus according to claim 6, wherein
the sensing apparatus is provided for a vehicle, and
the monitoring controller determines whether or not there is a danger based on at least one of the object information and the movement information of the object.

8. An object detector, comprising:
a light source;
a light deflector configured to deflect light emitted from the light source; and
a photodetector configured to detect the light that is deflected by the light deflector and then is reflected at an object, wherein
the light deflector includes a plurality of reflection planes that rotate on a rotation axis,
the reflection planes are oblique to the rotation axis and are rotationally symmetrical about the rotation axis,
the light that is emitted from the light source enters the light deflector in a direction parallel to the rotation axis,
the light that is reflected at the object is deflected by the light deflector and then is detected by the photodetector, and
a position at which the light reflected at the object enters the light deflector is closer to a center of rotation of the reflection planes than a position at which the light that is emitted from the light source enters the light deflector.

9. The object detector of claim 8, wherein a line of intersection of neighboring two of the reflection planes has a direction orthogonal to the rotation axis.

10. The object detector of claim 8, further comprising:
a housing that accommodates the light source, the light deflector, and the photodetector, and has a window covered by a light-transmissive cover, wherein
a portion of the cover through which the light reflected at the object passes has a light-gathering function, and
a portion of the cover through which the light emitted from the light source and deflected by the light deflector passes has no light-gathering function.

11. The object detector of claim 8, wherein
the reflection planes are formed on a surface of a rotor, and
the rotor has inner space in which a driving unit for rotating the rotor is accommodated.

12. A sensing apparatus, comprising:
the object detector of claim 8, and
a monitoring controller configured to determine whether or not an object is present, and obtain movement information of the object including at least one of a moving direction and a moving speed of the object, based on an output from the object detector.

13. The sensing apparatus of claim 12, wherein
the sensing apparatus is provided for a vehicle, and
the monitoring controller determines whether or not there is a danger based on at least one of the object information and the movement information of the object.

14. An object detector, comprising:
a light source;
a light deflector configured to deflect light emitted from the light source; and
a photodetector configured to detect the light that is deflected by the light deflector and then is reflected at an object, wherein
the light deflector includes a plurality of reflection planes that rotate on a rotation axis,
the reflection planes are oblique to the rotation axis and are rotationally symmetrical about the rotation axis,
the light that is emitted from the light source enters the light deflector in a direction parallel to the rotation axis,
the light source includes a two-dimensionally arranged plurality of light-emitting units, and
some of the light-emitting units are selected and switched on in synchronization with rotation of the reflection planes.

15. The object detector of claim 14, wherein a line of intersection of neighboring two of the reflection planes has a direction orthogonal to the rotation axis.

16. The object detector of claim 14, further comprising:
a housing that accommodates the light source, the light deflector, and the photodetector, and has a window covered by a light-transmissive cover, wherein
a portion of the cover through which the light reflected at the object passes has a light-gathering function, and
a portion of the cover through which the light emitted from the light source and deflected by the light deflector passes has no light-gathering function.

17. The object detector according to claim 14, wherein
the reflection planes are formed on a surface of a rotor, and
the rotor has inner space in which a driving unit for rotating the rotor is accommodated.

18. A sensing apparatus, comprising:
the object detector of claim 14, and
a monitoring controller configured to determine whether or not an object is present, and obtain movement information of the object including at least one of a moving direction and a moving speed of the object, based on an output from the object detector.

19. A sensing apparatus of claim 18, wherein
the sensing apparatus is provided for a vehicle, and
the monitoring controller determines whether or not there is a danger based on at least one of the object information and the movement information of the object.

* * * * *